United States Patent
Baker et al.

(10) Patent No.: US 11,250,203 B2
(45) Date of Patent: Feb. 15, 2022

(54) BROWSING IMAGES VIA MINED HYPERLINKED TEXT SNIPPETS

(71) Applicant: Microsoft Corporation, Redmond, WA (US)

(72) Inventors: Simon John Baker, Palo Alto, CA (US); Anitha Kannan, Mountain View, CA (US); Krishnan Ramnath, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1098 days.

(21) Appl. No.: 13/964,516

(22) Filed: Aug. 12, 2013

(65) Prior Publication Data

US 2015/0046781 A1    Feb. 12, 2015

(51) Int. Cl.
*G06F 3/0484*       (2013.01)
*G06F 40/134*       (2020.01)
(Continued)

(52) U.S. Cl.
CPC .......... *G06F 40/134* (2020.01); *G06F 3/0484* (2013.01); *G06F 16/245* (2019.01);
(Continued)

(58) Field of Classification Search
CPC ......... G06F 17/30244; G06F 17/30265; G06F 17/30867; G06F 15/24; G06F 17/22;
(Continued)

(56) References Cited

U.S. PATENT DOCUMENTS

| | | |
|---|---|---|
| 5,889,886 A | 3/1999 | Mahoney |
| 6,285,995 B1 | 9/2001 | Abdel-Mottaleb et al. |

(Continued)

FOREIGN PATENT DOCUMENTS

| | | |
|---|---|---|
| CN | 102822853 A | 12/2012 |
| CN | 103136228 A | 6/2013 |

(Continued)

OTHER PUBLICATIONS

Hillinger, Michael L. "What's really new about multimedia." Training & Development, vol. 51, No. 8, Aug. 1997, p. 46+. Accessed Mar. 23, 2021. (Year: 1997).*

(Continued)

*Primary Examiner* — Kavita Stanley
*Assistant Examiner* — Tionna M Burke

(57) ABSTRACT

Images stored in an information repository are prepared for browsing. For each image in the repository, text in the repository is mined to extract snippets of text about the image which are semantically relevant to the image, and for each of these snippets of text, keyterms are detected in the snippet of text which represent either concepts that are related to the image or entities that are related to the image, and the snippet of text and keyterms are associated with the image. Each keyterm that is associated with each image in the repository is hyperlinked to each other image in the repository that has this keyterm associated therewith. A graphical user interface allows a user to browse the images in the repository by using their associated snippets of text and hyperlinked keyterms.

13 Claims, 16 Drawing Sheets

(51) Int. Cl.
*G06F 16/245* (2019.01)
*G06F 16/951* (2019.01)
*G06F 16/9535* (2019.01)
*G06F 16/2457* (2019.01)
*G06F 16/58* (2019.01)
*G06F 40/205* (2020.01)

(52) U.S. Cl.
CPC ........ *G06F 16/24578* (2019.01); *G06F 16/58* (2019.01); *G06F 16/951* (2019.01); *G06F 16/9535* (2019.01); *G06F 40/205* (2020.01)

(58) Field of Classification Search
CPC ...... G06F 40/134; G06F 16/245; G06F 16/58; G06F 16/9535
USPC ......................................................... 715/208
See application file for complete search history.

(56) References Cited

U.S. PATENT DOCUMENTS

| | | | |
|---|---|---|---|
| 7,065,520 B2 | 6/2006 | Langford | |
| 7,200,271 B2* | 4/2007 | Boose ................ | G06F 17/2229 382/229 |
| 7,543,758 B2 | 6/2009 | Dymetman et al. | |
| 7,702,185 B2 | 4/2010 | Keating et al. | |
| 7,840,502 B2 | 11/2010 | Li et al. | |
| 8,107,929 B2 | 1/2012 | Citrin et al. | |
| 8,321,424 B2 | 11/2012 | Li et al. | |
| 8,503,769 B2 | 8/2013 | Baker et al. | |
| 9,183,436 B2 | 11/2015 | Baker et al. | |
| 2002/0126990 A1* | 9/2002 | Rasmussen ........ | H04N 7/17318 386/240 |
| 2004/0119741 A1 | 6/2004 | Teng et al. | |
| 2005/0246623 A1 | 11/2005 | Ma et al. | |
| 2005/0289447 A1* | 12/2005 | Hadley ............... | G06F 17/2235 715/205 |
| 2006/0143176 A1 | 6/2006 | Mojsilovic et al. | |
| 2006/0239515 A1 | 10/2006 | Zhang et al. | |
| 2006/0250764 A1* | 11/2006 | Howarth ............... | G06F 1/1632 361/679.41 |
| 2007/0016543 A1* | 1/2007 | Epling .................. | G06F 9/4443 |
| 2007/0047002 A1* | 3/2007 | Hull .................. | G06F 17/30047 358/3.28 |
| 2007/0162842 A1 | 7/2007 | Ambachtsheer et al. | |
| 2007/0174269 A1* | 7/2007 | Jing .................. | G06F 17/30265 |
| 2008/0069438 A1 | 3/2008 | Winn et al. | |
| 2008/0126191 A1* | 5/2008 | Schiavi .............. | G06Q 30/0258 705/14.56 |
| 2008/0147622 A1 | 6/2008 | Koike | |
| 2008/0152238 A1 | 6/2008 | Sarkar | |
| 2009/0016615 A1 | 1/2009 | Hull et al. | |
| 2009/0123021 A1 | 5/2009 | Jung et al. | |
| 2009/0177959 A1 | 7/2009 | Chakrabarti et al. | |
| 2009/0285487 A1 | 11/2009 | Knoblock et al. | |
| 2009/0299725 A1 | 12/2009 | Grigsby et al. | |
| 2010/0073398 A1 | 3/2010 | Fisher et al. | |
| 2010/0076984 A1 | 3/2010 | Papadopoullos et al. | |
| 2010/0122092 A1 | 5/2010 | Yaghmai | |
| 2010/0223276 A1 | 9/2010 | Al-Shameri et al. | |
| 2011/0047145 A1* | 2/2011 | Ershov .................. | G06F 16/904 707/722 |
| 2011/0047513 A1 | 2/2011 | Onogi et al. | |
| 2011/0153653 A1 | 6/2011 | King et al. | |
| 2011/0202531 A1* | 8/2011 | Zuckerberg ....... | G06F 17/30265 707/737 |
| 2011/0258556 A1 | 10/2011 | Kiciman et al. | |
| 2011/0302162 A1* | 12/2011 | Xiao .................. | G06F 17/30867 707/724 |
| 2012/0072463 A1 | 3/2012 | Moganti et al. | |
| 2012/0163707 A1 | 6/2012 | Simon et al. | |
| 2013/0138636 A1* | 5/2013 | Jin .................... | G06F 17/30244 707/723 |
| 2013/0311329 A1* | 11/2013 | Knudson ................ | G06Q 50/01 705/26.9 |
| 2013/0315480 A1 | 11/2013 | Baker et al. | |
| 2015/0120719 A1* | 4/2015 | Aarabi .............. | G06F 17/30256 707/728 |

FOREIGN PATENT DOCUMENTS

| | | |
|---|---|---|
| JP | H1153389 A | 2/1999 |
| JP | 2009116531 A | 5/2009 |
| JP | 2010092476 A | 4/2010 |
| JP | 2012063890 A | 3/2012 |
| RU | 2405190 C2 | 11/2010 |
| WO | 2008095237 A1 | 8/2008 |
| WO | 2009117830 A1 | 10/2009 |

OTHER PUBLICATIONS

Zhang, et al.,"Relevance Feedback in Content-Based Image Search", Invited Keynote at 12th Int. Conf. on New Information Technology (NIT), 8 pages, Beijing, China, retrieved at <<http://research.microsoft.com/en-us/people/zhengc/nit01hj.pdf>>.
Chennapragada et al., "Explore images with Google Image Swirl, now in Labs", Nov. 17, 2009, 8 pages, retrieved at <<http://googleblog.blogspot.com/2009/11/explore-images-with-google-image-swirl.html>>.
U.S. Appl. No. 13/366,385, First Named Inventor: Baker, "Image Annotations on Web Pages", Filing Date: Feb. 6, 2012.
Gabrilovich, et al., "Computing Semantic Relatedness using Wikipedia-based Explicit Semantic Analysis", Proceedings of the 20th international joint conference on Artifical intelligence (IJCAI'07), Jan. 2007, pp. 1606-1611, Morgan Kaufmann Publishers Inc., Hyderabad, India.
Milne, et al., "Learning to Link with Wikipedia", Proceedings of the 17th ACM conference on Information and knowledge management (CIKM '08), Oct. 26-30, 2008, pp. 10, Association for Computing Machinery (ACM), Napa Valley, California.
"International Search Report and Written Opinion Issued in PCT Patent Application No. PCT/US2014/050252", dated Feb. 23, 2015, 16 Pages.
Leong, et al., "Text Mining for Automatic Image Tagging", In Proceedings of the 23rd International Conference on Computational Linguistics: Posters, Aug. 23, 2010, pp. 647-655.
"Office Action Issued in Mexican Patent Application No. MX/a/2016/001848", dated May 23, 2017, 4 Pages.
"Office Action Issued In Japanese Patent Application No. 2016-533454", dated Sep. 4, 2018, 3 Pages. (W/o English Translation).
"Office Action Issued In Japanese Patent Application No. 2016-533454", dated Sep. 4, 2018, 4 Pages.
"Non Final Office Action Issued in U.S. Appl. No. 12/979,375", dated Oct. 26, 2012, 10 Pages.
"Non Final Office Action Issued in U.S. Appl. No. 13/959,724", dated Dec. 4, 2014, 8 Pages.
"First Office Action Issued in Chinese Patent Application No. 201480044558.8", dated Apr. 18, 2018, 11 Pages.
"Office Action and Search Report Issued in Russian Patent Application No. 2016104525", dated Apr. 19, 2018, 8 Pages. (W/o English Translation).
Fan, et al., "Photo-to-Search: Using Multimodal Queries to Search the Web From Mobile Devices", In Proceedings of the 7th ACM SIGMM International workshop on Multimedia information retrieval, Nov. 10, 2005, 8 Pages.
Lawrence, et al., "Using URLs and Table Layout for Web Classification Tasks", In Proceedings of the 13th International conference on World Wide Web, May 17, 2004, 10 Pages.
"Office Action Issued in Mexican Patent Application No. MX/a/2016/001848", dated Sep. 28, 2017, 7 Pages.
Wang, et al., "ARISTA—Image Search to Annotation on Billions of Web Photos", In Proceedings of the IEEE Conference on Computer Vision and Pattern Recognition, Jun. 13, 2010, 8 pages.
"Office Action Issued in Australian Patent Application No. 2014306879", dated Mar. 28, 2019, 3 Pages.

(56) References Cited

OTHER PUBLICATIONS

"Office Action Issued in European Patent Application No. 14759369.3", dated Nov. 18, 2019, 9 Pages.
"Office Action Issued in Indian Patent Application No. 201647002799", dated Oct. 28, 2020, 6 Pages.
"Office Action Issued in Canada Patent Application No. 2,918,833", dated Sep. 15, 2020, 03 Pages.
"Office Action Issued in Korean Patent Application No. 10-2016-7003641", dated Sep. 29, 2020, 8 Pages.
"Office Action Issued in Korean Patent Application No. 10-2016-7003641", dated Apr. 21, 2021, 15 Pages.
"Office Action Issued in Canadian Patent Application No. 2,918,833", dated Feb. 25, 2021, 6 Pages.
"Second Written Opinion Issued In PCT Application No. PCT/US2014/050252", dated Aug. 19, 2015, 8 Pages.
"International Preliminary Report on Patentability Issued in PCT Application No. PCT/US2014/050252", dated Nov. 13, 2015, 8 Pages.

\* cited by examiner

BROWSING IMAGES VIA MINED HYPERLINKED TEXT SNIPPETS

BACKGROUND

The Internet is a global data communications system that serves billions of users worldwide. The Internet provides users access to a vast array of online information resources and services, including those provided by the World Wide Web, intranet-based enterprises, and the like. The World Wide Web is organized as a collection of websites each of which is organized as a collection of webpages. A given webpage may include a wide variety of different types of online information such as text, images, graphics, audio and video. The World Wide Web currently hosts billions of webpages which collectively currently host approximately one trillion images and these numbers continue to grow at a rapid pace. Many different search engines exist today which provide users with the ability to search for desired online information either on a specific computing device or on a network such as the Internet or a private network. Thanks to the ubiquity of the various types of personal computing devices that exist today (such as personal computers, laptop/notebook computers, smart phones and tablet computers) and the ubiquity of the Internet, users routinely use one or more search engines to locate particular images they are interested in.

SUMMARY

This Summary is provided to introduce a selection of concepts, in a simplified form, that are further described hereafter in the Detailed Description. This Summary is not intended to identify key features or essential features of the claimed subject matter, nor is it intended to be used as an aid in determining the scope of the claimed subject matter.

Image browsing framework embodiments described herein are generally applicable to allowing a user to browse images that are stored in an information repository that includes a plurality of images and text. In one exemplary embodiment the images are prepared for browsing as follows. For each of the images in the repository, the text in the repository is mined to extract one or more snippets of text about the image, where each of these one or more snippets is semantically relevant to the image. Then, for each of the extracted snippets of text about the image, one or more keyterms are detected in this snippet, where each of the keyterms represents either a concept that is related to the image or an entity that is related to the image, and this snippet and these one or more keyterms are associated with the image. Each of the keyterms that is associated with each of the images in the repository is then hyperlinked to each other image in the repository that has this keyterm associated therewith.

In another exemplary embodiment where the images and text in the information repository are stored in the form of webpages each of which is structured using HyperText Markup Language (HTML) code, the repository is mined to extract snippets of text about a particular image in the repository. All of the webpages in the repository that include the particular image are identified. A list of triples is then generated, where each triple corresponds to a different one of the identified webpages and includes the Uniform Resource Locator (URL) of the particular image, the URL of the identified webpage, and the HTML code for the identified webpage. A prescribed number of triples is then randomly selected from the list of triples, this random selection generating a random subset of triples. The following actions then take place for each of the identified webpages in the random subset of triples. The HTML code for the identified webpage is parsed resulting in a parse tree. Image nodes and text nodes in the parse tree are then found. The linear ordering of these nodes in the identified webpage is then determined. A one of the image nodes that includes the URL of the particular image is then identified, where this identification includes deleting the identified webpage from the random subset of triples whenever either none of the image nodes includes the URL of the particular image, or more than one of the image nodes includes the URL of the particular image. Each of the text nodes is then split into one or more sentences, which are then filtered to remove any sentence that does not start with a capitalized letter and does not end with an appropriate punctuation mark. A distance in characters from each of the filtered sentences to the identified image node is then computed. A sentence word vector for each of the filtered sentences is then generated. The text that is associated with the identified image node in each of the identified webpages in the random subset of triples is then aggregated, and an image word vector is generated for this aggregated text. The following actions then take place for each of the filtered sentences in each of the identified webpages in the random subset of triples. A relevance score for the filtered sentence representing an estimate of how relevant the filtered sentence is to the particular image is generated, and an interestingness score for the filtered sentence representing an estimate of how interesting the filtered sentence is to the user is generated. A total score for the filtered sentence is then generated from these relevance and interestingness scores, where this total score indicates how relevant and interesting the filtered sentence is. Any of the filtered sentences whose combined relevance and interestingness score is greater than a prescribed score threshold are selected, and these selected filtered sentences are assigned to be the snippets of text about the particular image.

In yet another exemplary embodiment an image browsing graphical user interface (GUI) is displayed on a display device, where the GUI includes a current image sector. A request from the user to view a desired image in the information repository is then received. The desired image is then displayed within the current image sector, and one or more hotspots are displayed on top of the desired image, where each of the hotspots is hyperlinked to a different snippet of text about the desired image which is semantically relevant to the desired image and includes one or more keyterms, each of the keyterms represents either a concept that is related to the desired image or an entity that is related to the desired image, and each of the keyterms is hyperlinked to each other image in the repository that has this keyterm associated therewith.

DESCRIPTION OF THE DRAWINGS

The specific features, aspects, and advantages of the image browsing framework embodiments described herein will become better understood with regard to the following description, appended claims, and accompanying drawings where:

DETAILED DESCRIPTION

Figure 1:
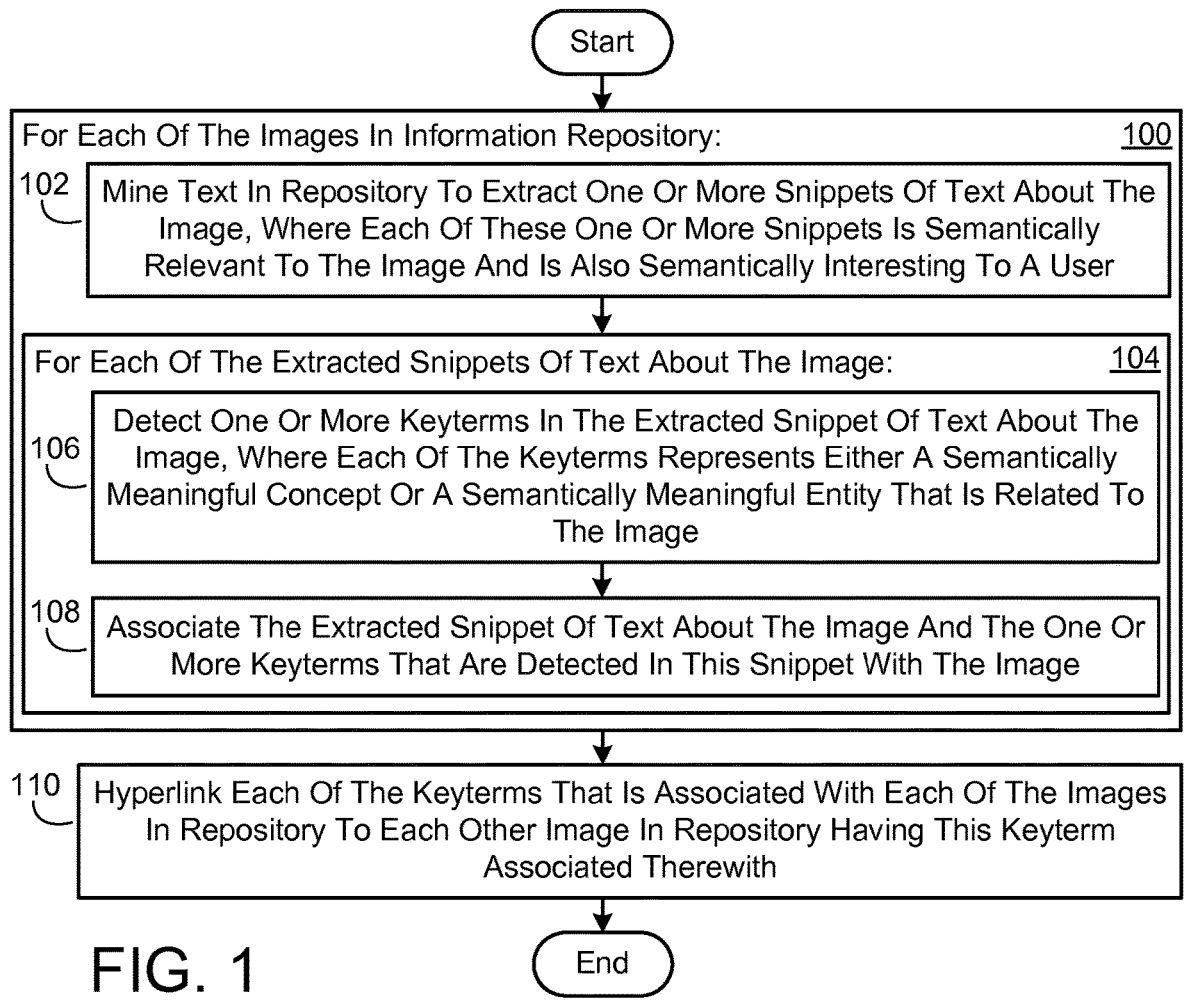
FIG. 1 is a flow diagram illustrating an exemplary embodiment, in simplified form, of a process for preparing images that are stored in an information repository for browsing.

In the following description of image browsing framework embodiments reference is made to the accompanying drawings which form a part hereof, and in which are shown, by way of illustration, specific embodiments in which the image browsing framework can be practiced. It is understood that other embodiments can be utilized and structural changes can be made without departing from the scope of the image browsing framework embodiments.

It is also noted that for the sake of clarity specific terminology will be resorted to in describing the image browsing framework embodiments described herein and it is not intended for these embodiments to be limited to the specific terms so chosen. Furthermore, it is to be understood that each specific term includes all its technical equivalents that operate in a broadly similar manner to achieve a similar purpose. Reference herein to "one embodiment", or "another embodiment", or an "exemplary embodiment", or an "alternate embodiment", or "one implementation", or "another implementation", or an "exemplary implementation", or an "alternate implementation" means that a particular feature, a particular structure, or particular characteristics described in connection with the embodiment or implementation can be included in at least one embodiment of the image browsing framework. The appearances of the phrases "in one embodiment", "in another embodiment", "in an exemplary embodiment", "in an alternate embodiment", "in one implementation", "in another implementation", "in an exemplary implementation", and "in an alternate implementation" in various places in the specification are not necessarily all referring to the same embodiment or implementation, nor are separate or alternative embodiments/implementations mutually exclusive of other embodiments/implementations.

Yet furthermore, the order of process flow representing one or more embodiments or implementations of the image browsing framework does not inherently indicate any particular order not imply any limitations of the image browsing framework.

The term "image" is used herein to refer to a digital image that can be viewed on a computer display device (such as a computer monitor, among other things). The term "user" is used herein to refer to an individual who is using a computer (herein also referred to as a computing device) to browse images. The term "sector" is used herein to refer to a segmented region of the display screen of a computer display device in which a particular type of graphical user interface (GUI) and/or information (such as one or more images and text, among other things) can be displayed, or a particular type of action can performed by a user, where the GUI/information/action are generally associated with a particular application program that is running on the computer. As is appreciated in the art of computer operating environments, a given computer display device can include a plurality of different sectors which may be layered or overlapped one on top of another.

1.0 Browsing Images Via Mined Hyperlinked Text Snippets

Generally speaking, the image browsing framework embodiments described herein prepare images for browsing, where the images are stored in an information repository that includes a plurality of images and text. Once the images have been prepared for browsing, the image browsing framework embodiments also allow a user to browse the images in a semantically meaningful manner. In an exemplary embodiment of the image browsing framework described herein the information repository is the World Wide Web (hereafter simply referred to as the Web) and the images and text in the repository are stored in the form of webpages each of which is structured using HyperText Markup Language (HTML) code. However, it will be appreciated that alternate embodiments of the image browsing framework are also possible where the information repository can be any other type of database mechanism which stores images and text and can also store other types of information, where this database mechanism can be either distributed or centralized.

The image browsing framework embodiments described herein are advantageous for various reasons including, but not limited to, the following. As will be appreciated from the more detailed description that follows, the image browsing framework embodiments provide a user who is searching for images (e.g., a user who is using a search engine to do an image search on the Web) with semantically interesting textual information about the images that are viewed by the user. The image browsing framework embodiments also suggest other semantically-related images for the user to look at. The image browsing framework embodiments also allow the user to semantically browse images on the Web (e.g., the user can transition from one image to the next in a semantically meaningful manner). The image browsing framework embodiments also provide the user with a user interface that is intuitive and easy to use. The image browsing framework embodiments thus optimize the efficiency and effectiveness of the image search process, and shorten the amount of time it takes for the user to locate particular images that either match their interests, or meet their needs, or educate them, or entertain them, or any combination thereof.

1.1 Process Framework

FIG. 1 illustrates an exemplary embodiment, in simplified form, of a process for preparing images that are stored in an information repository for browsing, where the repository includes a plurality of images and text. As described heretofore, in an exemplary embodiment of the image browsing framework described herein the information repository is the Web and the images and text in the repository are stored in the form of webpages each of which is structured using HTML code. As exemplified in FIG. 1, the process starts in block 100 with the following actions taking place for each of the images in the repository. The text in the repository is mined to extract one or more snippets of text about the image, where each of these one or more snippets is semantically relevant to the image and is also semantically interesting to a user who reads the snippet (block 102). This is advantageous because a user is often looking to be either entertained or educated when they are browsing the images that are stored in the repository. The following actions then take place for each of the extracted snippets of text about the image (block 104). One or more keyterms are detected in the extracted snippet of text about the image, where each of the keyterms represents either a semantically meaningful concept that is related to the image, or a semantically meaningful entity that is related to the image (block 106). The extracted snippet of text about the image and the one or more keyterms that are detected in this snippet are then associated with the image (block 108). After the actions of block 100 have been completed, each of the keyterms that is associated with each of the images in the repository is hyperlinked to each other image in the repository that has this keyterm associated therewith (block 110). In an exemplary embodiment of the image browsing framework this hyperlinking of keyterms to other images is implemented using an inverted index data structure.

It will be appreciated that the just-described mining of text in the information repository to extract one or more snippets of text about each of the images in the repository can be performed using various data mining methods. An exemplary embodiment of one such data mining method is described in more detail hereafter. It will also be appreciated that the just-described keyterm detection can be performed using various conventional methods. By way of example but not limitation, in an exemplary embodiment of the image browsing framework described herein the keyterms are article titles and variants thereof in Wikipedia, and the just-described keyterm detection is performed using a conventional semantic relatedness computation method which uses Wikipedia-based explicit semantic analysis. As such, and as will be appreciated from the more detailed description that follows, the just-described hyperlinking of keyterms to images in the repository is based on a measure of the keyterms' relatedness to the images.

Figure 2:
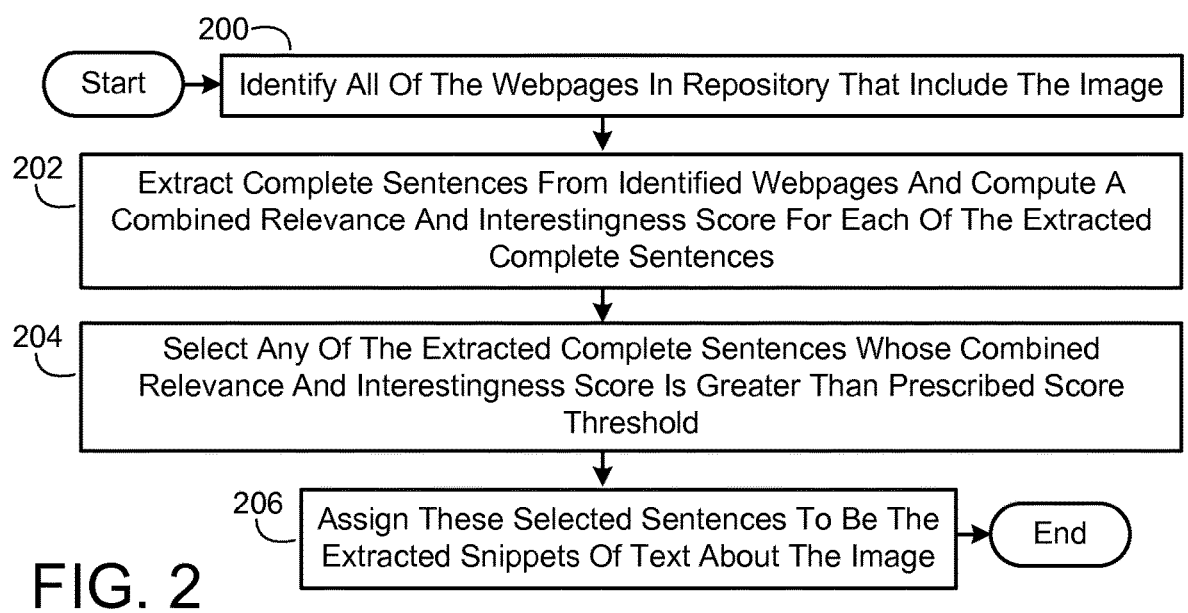
FIG. 2 is a flow diagram illustrating an exemplary embodiment, in simplified form, of a process for mining text in the information repository to extract one or more snippets of text about a given image in the repository.

FIG. 2 illustrates an exemplary embodiment, in simplified form, of a process for mining the text in the information repository to extract one or more snippets of text about a given image in the repository. The particular data mining method embodiment exemplified in FIG. 2 applies to the aforementioned embodiment of the image browsing framework described herein where the information repository is the Web and the images and text in the repository are stored in the form of webpages each of which is structured using HTML code. As exemplified in FIG. 2, the process starts in block 200 with identifying all of the webpages in the repository that include the image. Complete sentences are then extracted from the identified webpages and a combined relevance and interestingness score is computed for each of the extracted complete sentences (block 202). Any of the extracted complete sentences (e.g., any of the filtered sentences) whose combined relevance and interestingness score is greater than a prescribed score threshold are then selected (block 204). These selected sentences are then assigned to be the extracted snippets of text about the image (block 206).

Figure 3A:
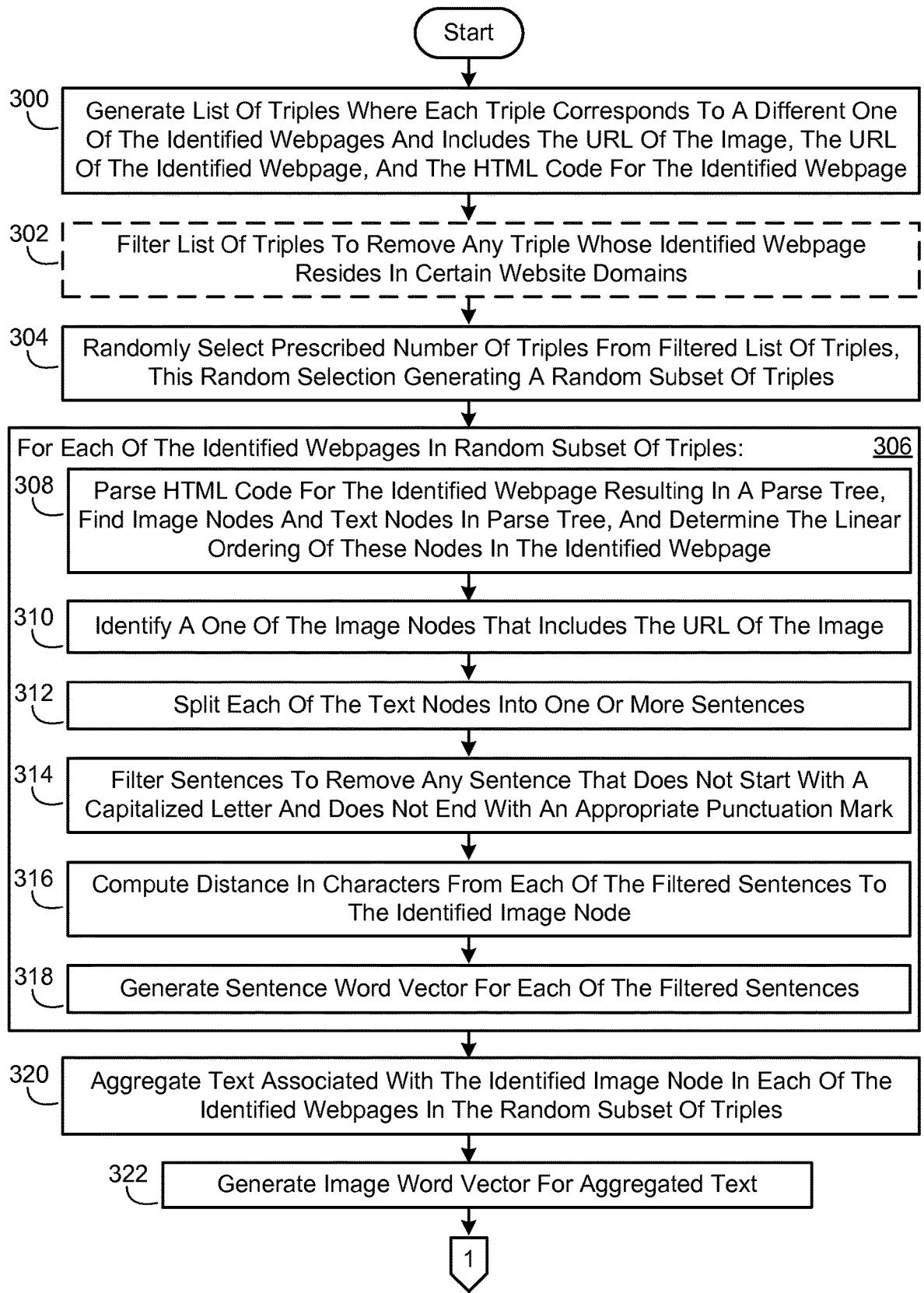
FIGS. 3A and 3B are flow diagrams illustrating an exemplary embodiment, in simplified form, of a process for extracting complete sentences from webpages in the information repository that are identified to include the image, and computing a combined relevance and interestingness score for each of the extracted complete sentences.
Figure 3B:
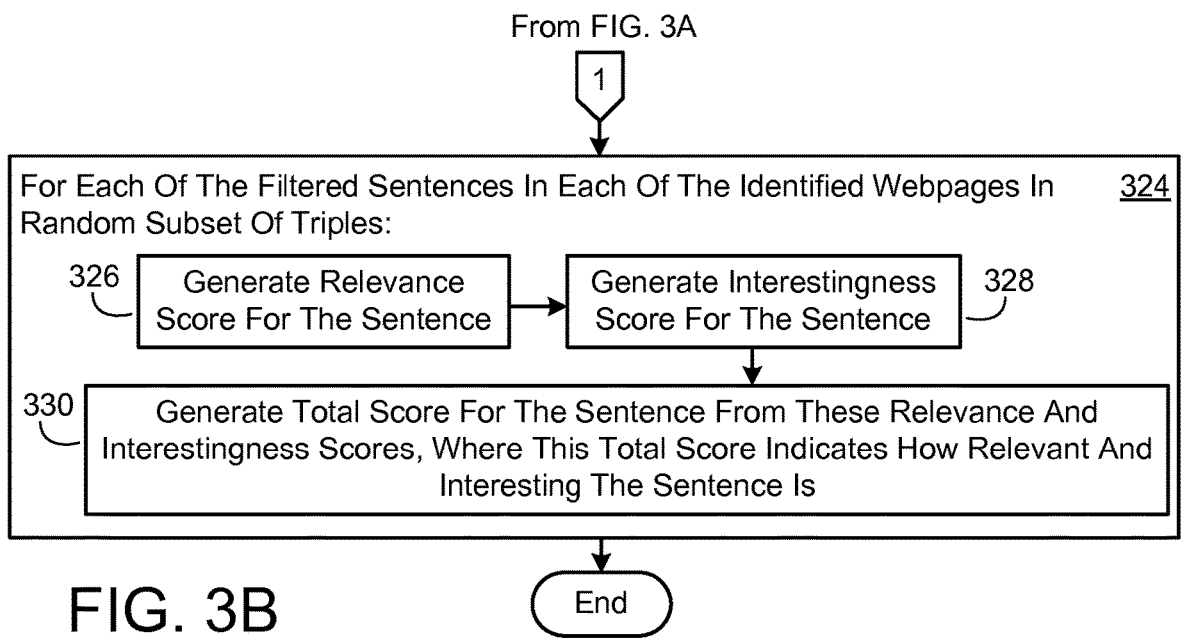

FIGS. 3A and 3B illustrate an exemplary embodiment, in simplified form, of a process for extracting complete sentences from the webpages in the information repository that are identified to include a given image, and computing a combined relevance and interestingness score for each of the extracted complete sentences. As exemplified in FIG. 3A, the process starts in block 300 with generating a list of triples where each triple in the list corresponds to a different one of the identified webpages and includes the Uniform Resource Locator (URL) of the image, the URL of the identified webpage, and the HTML code for the identified webpage. The list of triples can optionally then be filtered to remove any triple whose identified webpage resides in certain website domains (block 302). In an exemplary embodiment of the image browsing framework described herein this filtering is performed on the URLs of the identified webpages, and the website domains that are filtered out include social networking websites, photo sharing websites, and certain commercial websites. It will be appreciated that the website domains that are filtered out can be modified based on a given search engine's needs. This filtering can optionally also include one or more other types of webpage filtering including, but not limited to, the following. The list of triples can be filtered to remove any triple whose identified webpage is not in one or more prescribed languages (e.g., the list of triples can be filtered to remove any non-English webpages). The list of triples can also be filtered to remove any triple whose identified webpage includes certain types of content such as adult (e.g., obscene) content, among other types of content.

Referring again to FIG. 3A, after the list of triples has been filtered (block 302), a prescribed number of triples are then randomly selected from the filtered list of triples, this random selection generating a random subset of triples (block 304). In an exemplary embodiment of the image browsing framework this prescribed number is 200. It will be appreciated that this random selection of triples simply imposes a maximum on the number of identified webpages to process for the image, and thus serves to limit the processing that is performed for very common images (many of which are uninteresting such as company icons and the like). It will also be appreciated that in cases where the number of triples in the filtered list is less than the prescribed number, all of the triples in the filtered list are selected.

Referring again to FIG. 3A, after the random subset of triples has been generated (block 304), the following actions then take place for each of the identified webpages in the random subset of triples (block 306). The HTML code for the identified webpage is parsed resulting in a parse tree, image nodes and text nodes in the parse tree are found, and the linear ordering of these nodes in the identified webpage is determined (block 308). In the case where the HTML code for a given webpage cannot be parsed, the webpage can simply be deleted from the random subset of triples. A one of the image nodes that includes the URL of the image is then identified (block 310), where this identification includes deleting the identified webpage from the random subset of triples whenever either none of the image nodes includes the URL of the image (which can happen if the identified webpage has changed since the aforementioned HTML code aggregation), or more than one of the image nodes includes the URL of the image (which can happen if the identified webpage refers to the image a plurality of times). Each of the text nodes is then split into one or more sentences (block 312), which are then filtered to remove any sentence that does not start with a capitalized letter and does not end with an appropriate punctuation mark (block 314). This filtering thus ensures that the sentences are complete sentences (e.g., any sentence fragments are discarded). The distance in characters from each of the filtered sentences to the identified image node is then computed (block 316), where this character distance is given one sign (e.g., it is made positive) when the sentence appears after the identified image node, and this character distance is given the opposite sign (e.g., it is made negative) when the sentence appears before the identified image node. A sentence word vector is then generated for each of the filtered sentences (block 318), where stop words are excluded from the sentence word vector and stemming is performed.

It will be appreciated that the just-described HTML code parsing (block 308) can be performed in various ways. By way of example but not limitation, in an exemplary embodiment of the image browsing framework described herein this parsing is performed using a conventional HTML parser. It will also be appreciated that the just-described image node identification (block 310) can be performed in various ways. By way of example but not limitation, in an exemplary embodiment of the image browsing framework this identification is performed using a variety of string processing normalizations. It will also be appreciated that the just-described sentence splitting (block 312) can be performed using various conventional methods.

Referring again to FIG. 3A, after the actions of block 306 have been completed, the text that is associated with the identified image node in each of the identified webpages in the random subset of triples is aggregated (block 320). An image word vector is then generated for this aggregated text (block 322). It will be appreciated that this image word vector serves as an overall model of the content of the image. As exemplified in FIG. 3B, the following actions then take place for each of the filtered sentences in each of the identified webpages in the random subset of triples (block 324). A relevance score for the filtered sentence is generated (block 326), where this relevance score represents an estimate of how semantically relevant the filtered sentence is to the image. An interestingness score for the filtered sentence is then generated (block 328), where this interestingness score represents an estimate of how semantically interesting the filtered sentence is to a user. A total score for the filtered sentence is then generated from these relevance and interestingness scores, where this total score indicates how relevant and interesting the filtered sentence is (block 330). In an exemplary embodiment of the image browsing framework described herein the total score equals the relevance score multiplied by the interestingness score. Accordingly and as will be appreciated from the more detailed description that follows, a high total score indicates that the filtered sentence is both relevant and interesting, and a low total score indicates that the filtered sentence is neither relevant nor interesting.

In an exemplary embodiment of the image browsing framework described herein both the relevance and interestingness scores for each of the filtered sentences are generated using a learned regression function that is based on the computation of different features of the filtered sentence. In an exemplary embodiment of the image browsing framework described herein the learned regression function employed a regularized linear regression and training data that was obtained using Amazon Mechanical Turk (MTurk). More particularly, MTurk users were asked to score the relevance and interestingness of a large number of sentences on a scale from 0.0 to 3.0, where 0.0 corresponds to a given sentence being not relevant/interesting, and 3.0 corresponds to the sentence being very relevant/interesting. It will be appreciated that a wide range of different features of each of the filtered sentences can be computed. In an exemplary embodiment of the image browsing framework these features included, but were not limited to, a data term feature, various context features, a duplication feature, a distance feature, and various linguistic features. Each of these features will now be described in more detail.

The computation of the data term feature of a given filtered sentence involves computing a match score between the sentence word vector for the filtered sentence and the image word vector. In an exemplary embodiment of the image browsing framework described herein this match score is computed in the following manner. The image word vector is first normalized to be a unit vector. The dot product of the normalized image word vector and the word vector for the sentence is then computed. A prescribed maximum value can optionally then be imposed on this dot product in order to avoid overly favoring sentences with a large amount of overlap.

The context features are essentially contextual extensions of the data term feature. In an exemplary embodiment of the image browsing framework described herein two different context features are computed for each of the filtered sentences, namely a local context feature and a page context feature. The computation of the local context feature involves averaging the data term feature over a local window around the filtered sentence. The intuition behind the local context feature is that a given filtered sentence is more likely to be semantically relevant to the image and semantically interesting to a user if the other filtered sentences around the given filtered sentence are also semantically relevant to the image and semantically interesting to a user. The computation of the page context feature involves averaging the data term feature over an expanded window that is larger than the local window (e.g., in an exemplary embodiment of the image browsing framework the expanded window encompasses the entire identified webpage that the filtered sentence was extracted from). A prescribed maximum value can optionally be imposed on each computed context feature in order to avoid overly favoring sentences with a large amount of overlap.

The computation of the duplication feature of a given filtered sentence involves computing the overlap between the given filtered sentence and other filtered sentences that are within a prescribed distance from the given filtered sentence in the identified webpage that this sentence was extracted from. The intuition behind the duplication feature is that a large amount of duplication is often indicative of spam-like content. The computation of the distance feature of a given filtered sentence involves computing the distance, measured in characters, between the filtered sentence and the image in the identified webpage that this sentence was extracted from. Upper and lower bounds can optionally be imposed on this computed distance in order to avoid extreme cases. The intuition behind the distance feature is that sentences that are close to the image are more likely to be relevant to the image. Various linguistic features of a given filtered sentence can be computed, including but not limited to any one or more of the following. The length of the filtered sentence (e.g., the number of words in the filtered sentence) can be computed. It will be appreciated that longer sentences are generally more interesting to a user than shorter sentences. Various Boolean features of the filtered sentence can also be computed, such as whether or not the filtered sentence begins with a demonstrative, whether or not the filtered sentence is definitional, and whether or not the filtered sentence begins with a first person pronoun (e.g., I, or we), among other Boolean features.

Figure 4:
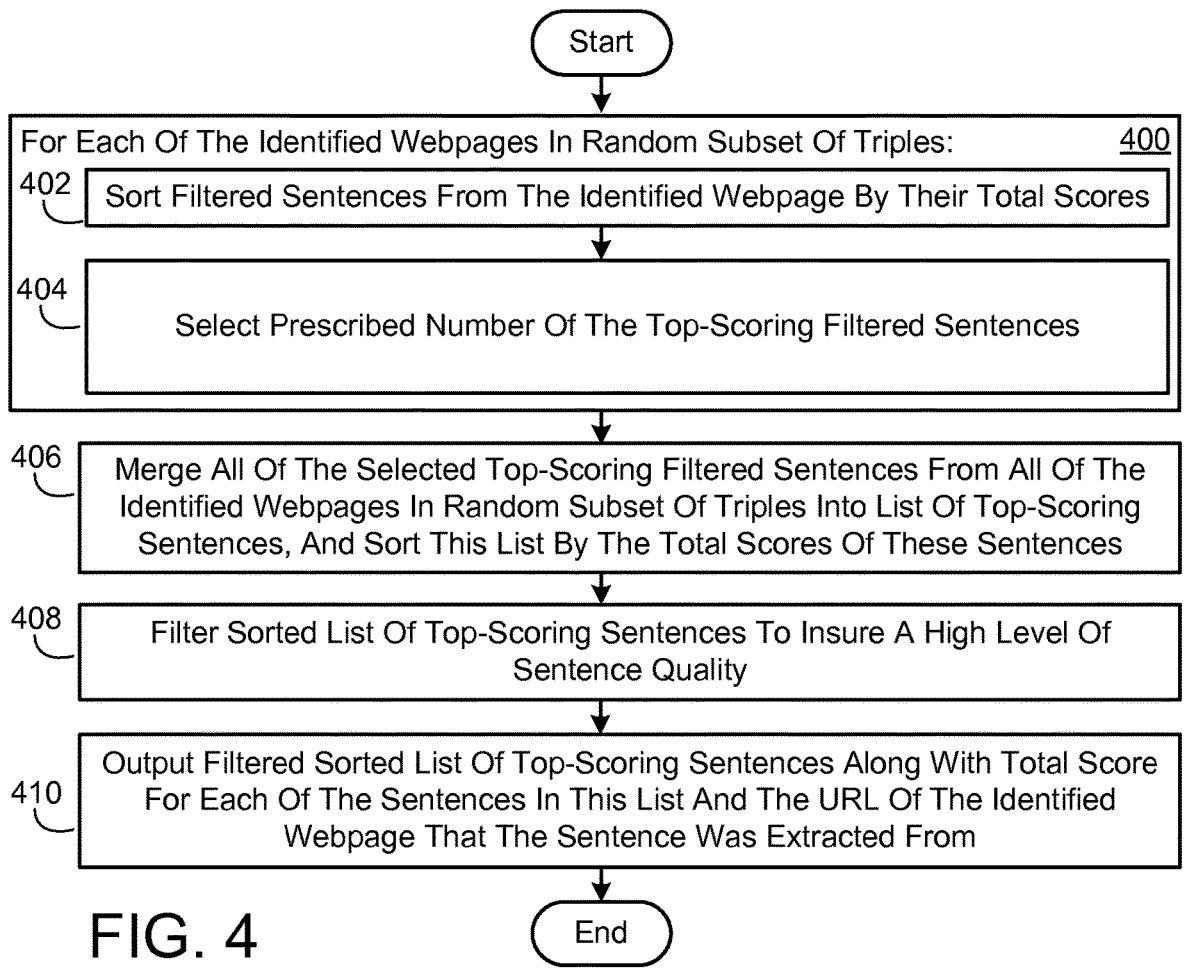
FIG. 4 is a flow diagram illustrating an exemplary embodiment, in simplified form, of a process for selecting any of the extracted complete sentences whose combined relevance and interestingness score is greater than a prescribed score threshold.

FIG. 4 illustrates an exemplary embodiment, in simplified form, of a process for selecting any of the extracted complete sentences whose combined relevance and interestingness score is greater than a prescribed score threshold. As exemplified in FIG. 4, the process starts in block 400 with the following actions taking place for each of the identified webpages in the aforementioned random subset of triples. The filtered sentences from the identified webpage are sorted by their total scores (block 402). A prescribed number of the top-scoring filtered sentences is then selected (block 404), where this selection eliminates any pairs of filtered sentences having a word overlap that is greater than a prescribed percentage. In an exemplary embodiment of the image browsing framework described herein this prescribed number is three and this prescribed percentage is 85%. It will be appreciated that this elimination of any pair of filtered sentences having a word overlap that is greater than 85% serves to eliminate any top-scoring pairs of filtered sentences that are nearly identical. After the actions of block 400 have been completed, all of the selected top-scoring filtered sentences from all of the identified webpages in the random subset of triples are merged into a list of top-scoring sentences, and this list is sorted by the total scores of these sentences (block 406). The sorted list of top-scoring sentences is then filtered in order to ensure a high level of sentence quality (block 408). Exemplary filtering operations are described in more detail hereafter. The filtered sorted list of top-scoring sentences is then output along with the total score for each of the sentences in this list and the URL of the identified webpage that the sentence was extracted from (block 408).

Figure 5:
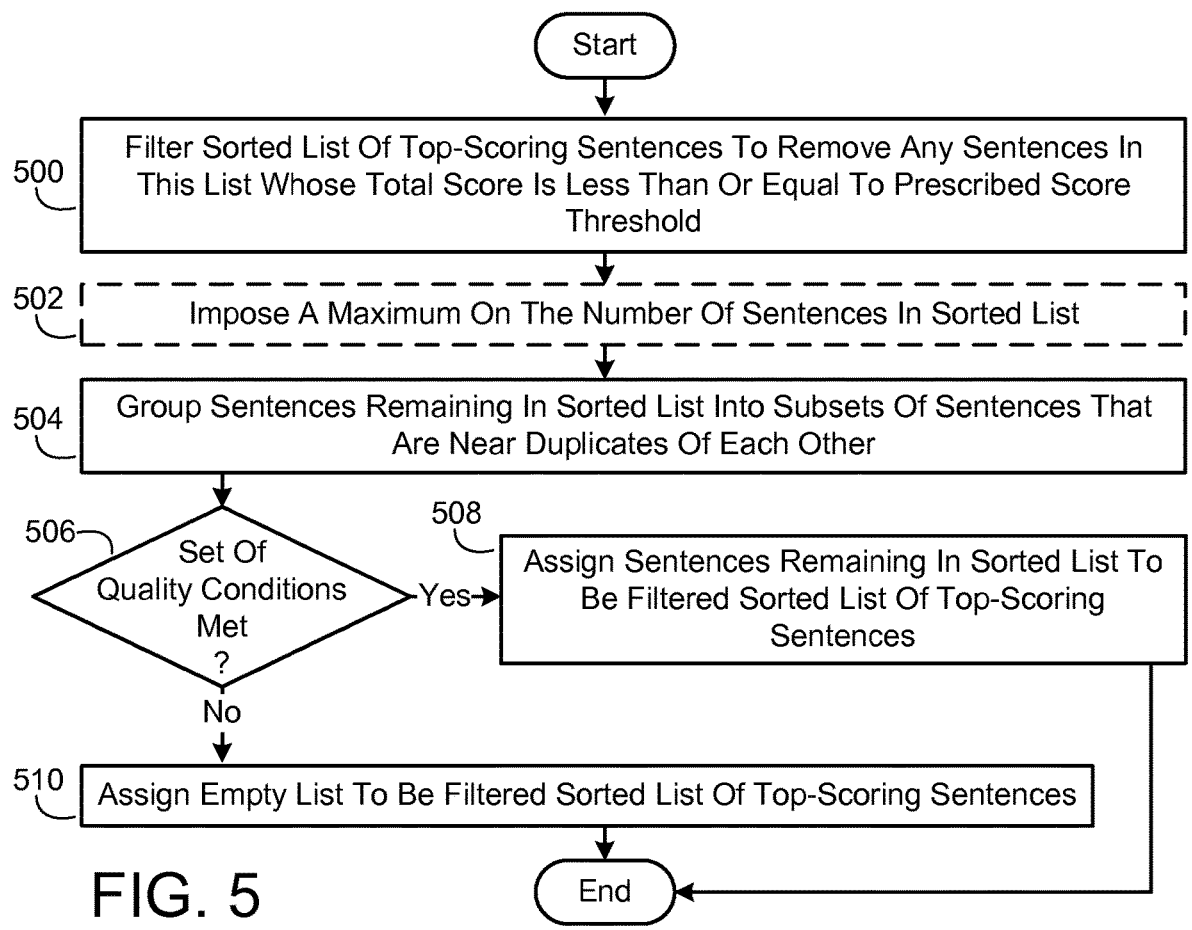
FIG. 5 is a flow diagram illustrating an exemplary embodiment, in simplified form, of a process for filtering a sorted list of the top-scoring extracted complete sentences.

FIG. 5 illustrates an exemplary embodiment, in simplified form, of a process for filtering the sorted list of top-scoring sentences. As exemplified in FIG. 5, the process starts in block 500 with filtering the sorted list to remove any sentences in this list whose total score is less than or equal to the aforementioned prescribed score threshold. In the aforementioned exemplary embodiment of the image browsing framework described herein where relevance and interestingness of the sentences is scored on a scale from 0.0 to 3.0, a score of 3.0 corresponding to the sentence being very relevant/interesting, the prescribed score threshold is 2.75. A maximum can then optionally also be imposed on the number of sentences in the sorted list (block 502). More particularly, in an exemplary embodiment of the image browsing framework just the top 20 scoring sentences are selected from the sorted list. The sentences remaining in the sorted list are then grouped into subsets of sentences that are near duplicates of each other (e.g., the word overlap between each of the sentences in a given subset is above a prescribed overlap threshold) (block 504). Whenever a set of quality conditions is met (block 506, Yes), the sentences remaining in the sorted list are assigned to be the filtered sorted list of top-scoring sentences (block 508). Whenever the set of quality conditions is not met (block 506, No), all of the sentences remaining in the sorted list are removed therefrom so that an empty list is assigned to be the filtered sorted list of top-scoring sentences (block 510).

In an exemplary embodiment of the image browsing framework described herein the just-described set of quality conditions includes the following three conditions. There are to be at least a first prescribed number of sentences remaining in the sorted list of top-scoring sentences. The sentences remaining in the sorted list are to come from at least a second prescribed number of different identified webpages. The percentage of sentences remaining in the sorted list that are near duplicates of another sentence in the sorted list is to be less than a prescribed percentage. In an exemplary implementation of this embodiment the first prescribed number is three, the second prescribed number is two, and the prescribed percentage is 40%.

As will be appreciated from the more detailed description that follows, each of the keyterms that is detected in each of the extracted snippets of text about each of the images in the information repository is either a keyword or a keyphrase (e.g., a sequence of two or more words that form a constituent and so function as a single unit). Referring again to FIG. 1, the association between snippets of text and images that is established in the action of block 108 allows a search engine to access each of the snippets of text about each of the images in the repository. The association between keyterms and images that is also established in the action of block 108 allows a search engine to also access each of the keyterms that is detected in each of the snippets of text about each of the images in the repository. These snippet/image and keyterm/image associations also allow the extracted snippets of text about a given image, and the keyterms that are detected in each of these snippets of text, to be displayed to a user when they view the image. In an exemplary embodiment of the image browsing framework described herein where the repository includes metadata for each of the images that is stored in the repository, the action of block 108 can be implemented as follows. For each of the images in the repository, each of the extracted snippets of text about the image and the one or more keyterms that are detected therein are added to the metadata for the image.

Figure 6:
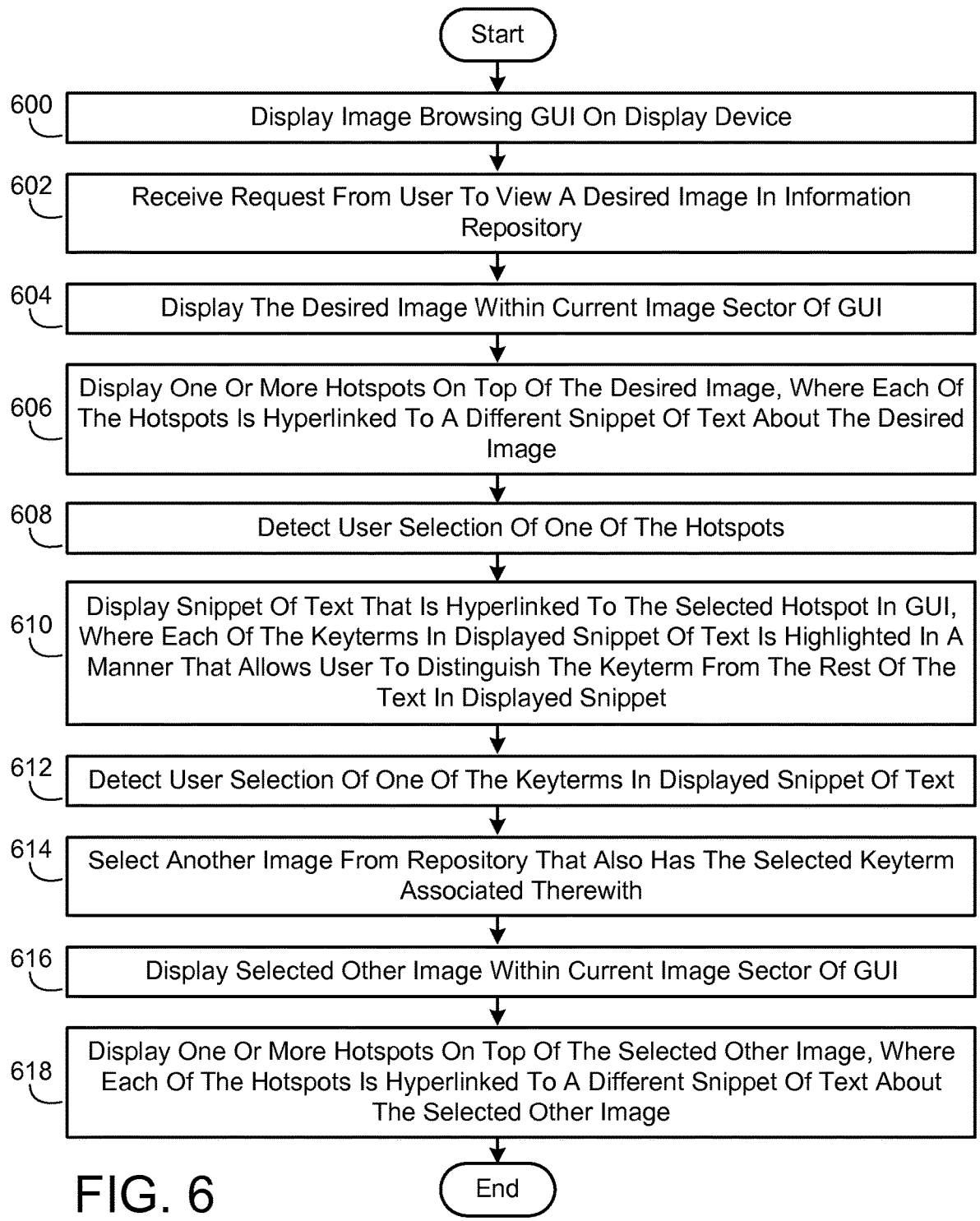
FIG. 6 is a flow diagram illustrating an exemplary embodiment, in simplified form, of a process for allowing a user to browse the prepared images.

FIG. 6 illustrates an exemplary embodiment, in simplified form, of a process for allowing a user to browse images that are stored in the information repository. The process embodiment exemplified in FIG. 6 assumes that the images that are stored in the repository have already been prepared for browsing as described heretofore. As exemplified in FIG. 6, the process starts in block 600 with displaying an image browsing GUI on the display device of the computer that the user is using to browse images. As will be described in more detail hereafter, the GUI includes a current image sector, and can optionally also include a keyterms sector and an image history sector. Upon the user generating a request to view a desired image in the repository, this request is received (block 602), and the desired image is displayed within the current image sector (block 604). One or more hotspots are then displayed on top of the desired image, where each of the hotspots is hyperlinked to a different snippet of text about the desired image which is semantically relevant to the desired image and includes one or more of the aforementioned keyterms (block 606).

As is appreciated in the art of online information management, a hotspot is a user-selectable, defined region of a given item of information (such as an image or the like) that is currently being displayed. It will be appreciated that hotspots can be displayed in various ways. In an exemplary embodiment of the image browsing framework described herein each of the hotspots is displayed as a semi-transparent shaded box.

Referring again to FIG. 6, upon the user selecting one of the hotspots, this user selection is detected (block 608) and the snippet of text that is hyperlinked to the selected hotspot is displayed in the image browsing GUI, where each of the keyterms in the displayed snippet of text is highlighted in a manner that allows the user to distinguish the keyterm from the rest of the text in the displayed snippet of text (block 610). As will be described in more detail hereafter, this snippet of text can be displayed in various ways and in various locations in the GUI. Exemplary keyterm highlighting methods are also described in more detail hereafter. Upon the user selecting one of the keyterms in the displayed snippet of text, this user selection is detected (block 612) and another image from the information repository is selected that also has the selected keyterm associated therewith (block 614). This selected other image is then displayed within the current image sector of the image browsing GUI (block 616). In other words, the concept or entity that is represented by the selected keyterm is also related to the selected other image from the information repository that is displayed to user. As such, the user is provided with another image that is semantically related to the desired image that they previously viewed. One or more hotspots are then displayed on top of the selected other image, where each of the hotspots is hyperlinked to a different snippet of text about the selected other image which is semantically relevant to the selected other image and includes one or more keyterms (block 618).

It will be appreciated that the user can select a given hotspot, or a given keyterm in the displayed snippet of text that is hyperlinked to the hotspot (or a given thumbnail in the image history sector of the image browsing GUI that is described in more detail hereafter, or a given keyterm in the keyterms sector of this GUI), in various ways including, but not limited to, the following. In the case where the display screen of the display device is touch-sensitive, the user can manually select the hotspot/keyterm/thumbnail by physically touching it using either one or more fingers, or a pen-type device. In the case where the user's computer includes a GUI selection device such as a computer mouse or the like, the user can use the GUI selection device to manually point to the hotspot/keyterm/thumbnail and then manually push a button on the GUI selection device (e.g., the user can use the GUI selection device to manually click on the hotspot/keyterm/thumbnail); the user may also be able to use the GUI selection device to manually hover over the hotspot/keyterm/thumbnail for a prescribed period of time. In the case where the user's computer includes a voice input and recognition subsystem, the user may also be able to verbally select a given keyterm in the displayed snippet of text by speaking the keyterm.

Referring again to FIG. 6, it will also be appreciated that the action of block 614 can be implemented in various ways. By way of example but not limitation, in an exemplary embodiment of the image browsing framework described herein the selection of another image from the information repository includes selecting another image from the repository that has the selected keyterm associated therewith the greatest number of times (e.g., selecting another image for which the selected keyterm is detected in the extracted snippets of text there-about the greatest number of times). The selection of another image from the repository can optionally also include taking into account the users image browsing history in order to avoid displaying the same image to the user again.

In the just-described process for allowing a user to browse images that are stored in the information repository, when a given image is first displayed within the current image sector just the hotspots that are hyperlinked to the snippets of text about the image are displayed on top of the image. As described heretofore the user can then select a given hotspot to view a given snippet of text about the image. In an alternate embodiment of the image browsing framework described herein, when a given image is first displayed within the current image sector a default one of the snippets of text about the image can be automatically displayed in the image browsing GUI in addition to the hotspots being displayed on top of the image. In one implementation of this alternate embodiment the default one of the snippets of text that is automatically displayed is the snippet of text about the image that has the greatest combined relevance and interestingness score. In another implementation of this alternate embodiment the default one of the snippets of text that is automatically displayed is the snippet of text about the image in which the particular keyterm that the user most recently selected (thus causing the image to be displayed within the current image sector), or the particular query term that the user originally used to search for the image, appears the greatest number of times. In yet another implementation of this alternate embodiment the default one of the snippets of text that is automatically displayed is selected based on a history of the keyterms the user has selected. Any combination of these just-described implementations can also be used.

1.2 User Interface Framework

FIGS. 7-15 illustrate an exemplary embodiment, in simplified form, of a generalized layout for a GUI that allows a user to browse the images that are stored in the information repository. The image browsing GUI 700 exemplified in FIGS. 7-15 assumes that the images that are stored in the repository have already been prepared for browsing as described heretofore. Accordingly and as will be appreciated from the more detailed description that follows, the GUI 700 exemplified in FIGS. 7-15 leverages the aforementioned hyperlinked structure that is created between keyterms and images (e.g., the GUI 700 leverages the fact that each of the keyterms that is associated with each of the images in the information repository is hyperlinked each other image in the repository that has this keyterm associated therewith) in a way that allows a user to semantically browse the images that are stored in the repository. As exemplified in FIGS. 7-15, the GUI 700 includes a current image sector 702, and can optionally also include a keyterms sector 704 and an image history sector 706. Exemplary embodiments of the usage of these different sectors 702/704/706 are described in more detail hereafter.

Figure 7:
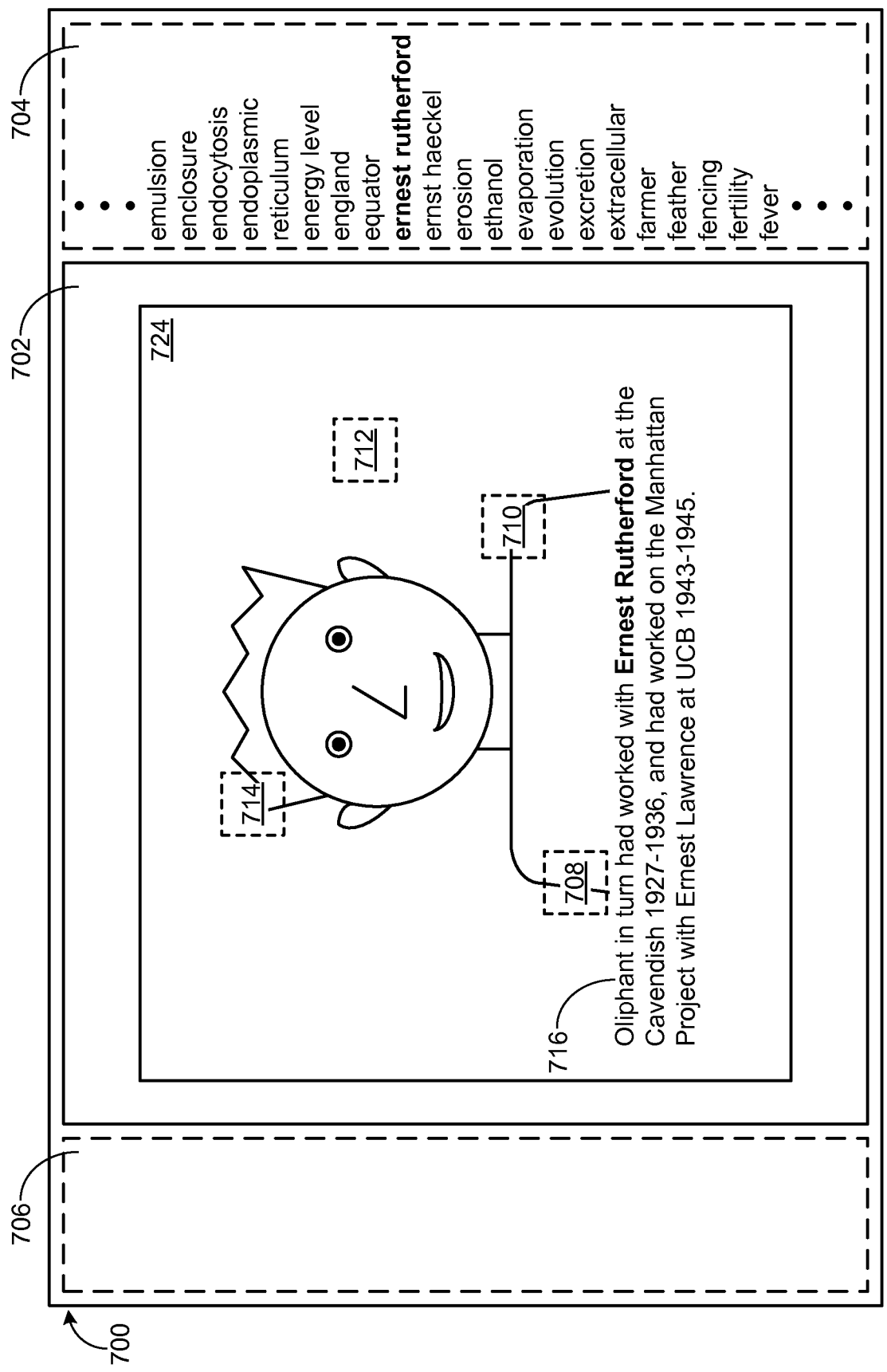
FIGS. 7-15 are diagrams illustrating an exemplary embodiment, in simplified form, of a generalized layout for a graphical user interface (GUI) that allows a user to semantically browse the images that are stored in the information repository.

As exemplified in FIG. 7, upon receiving the user's request to view an image of Ernest Rutherford that is stored in the information repository, the requested image of Ernest Rutherford 724 is displayed within the current image sector 702. Four hotspots 708/710/712/714 are also displayed on top of this requested image 724, where each of the hotspots 708/710/712/714 is hyperlinked to a different snippet of text (e.g. snippet 716) about the image 724 which is semantically relevant to the image 724. Upon detecting the user's selection of the hotspot 708, the snippet of text 716 that is hyperlinked to the selected hotspot 708 is displayed in the image browsing GUI 700. It will be appreciated that this snippet of text 716 (as well as the other snippets of text that are discussed hereafter) can be displayed in various ways and in various locations in the GUI 700 including, but not limited to, the following. In the particular GUI embodiment exemplified in FIGS. 7-15 each snippet of text is popped up on top of the image that is currently being displayed within the current image sector and adjacent to the hotspot to which the snippet is hyperlinked. In an alternate GUI embodiment (not shown) each snippet of text can be popped up on a side of the image so that the snippet does not obscure the image. In another alternate GUI embodiment (not shown) the GUI can include a snippet sector and each snippet of text can be displayed within the snippet sector. In yet another alternate GUI embodiment (not shown) each snippet of text can be popped up in a prescribed fixed location on top of the image (e.g., at the bottom of the image, among other fixed locations). The snippet of text 716 includes one keyterm (Ernest Rutherford) which is highlighted in a manner that allows the user to distinguish it from the rest of the text in the snippet 716. This keyterm highlighting can be performed in various ways including, but not limited to, either bolding the characters of the keyterm, or changing the color of the characters of the keyterm, or underlining the characters of the keyterm, or any combination of these ways.

Figure 8:
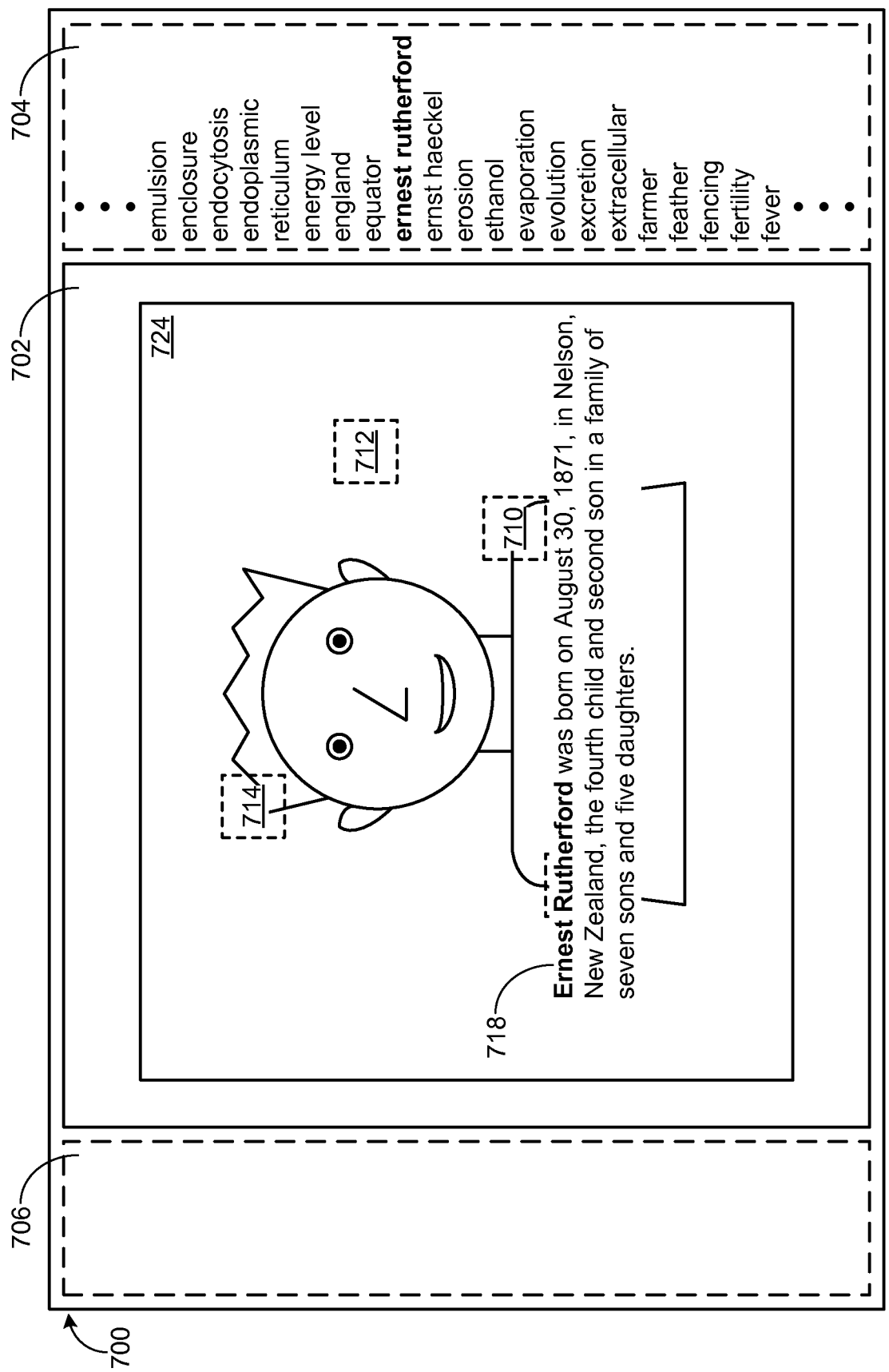
Figure 9:
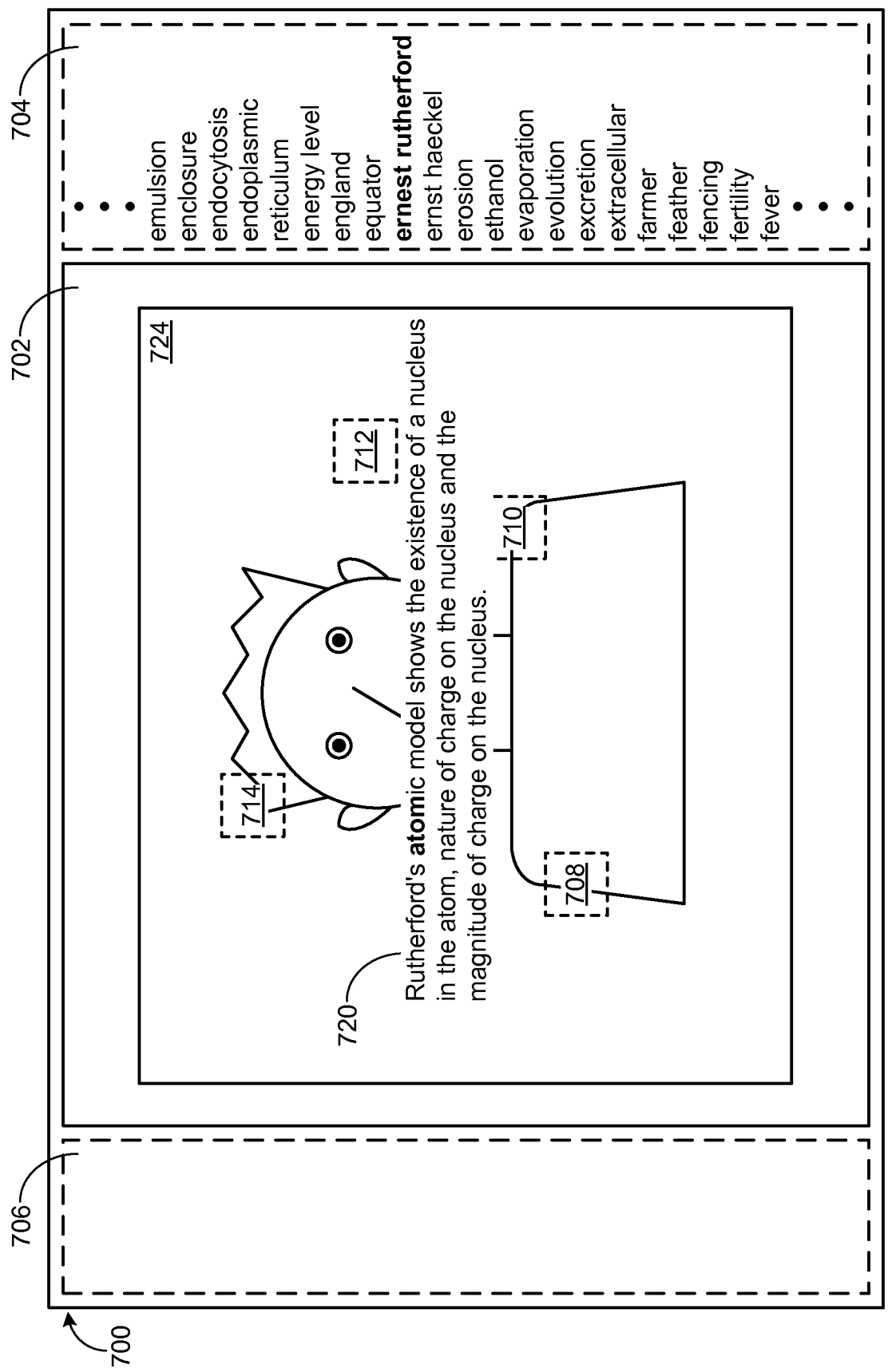

As exemplified in FIG. 8, upon detecting the user's selection of the hotspot 710, the snippet of text 718 that is hyperlinked to the selected hotspot 710 is displayed in the image browsing GUI 700. The snippet of text 718 includes one keyterm (Ernest Rutherford) which is highlighted. As exemplified in FIG. 9, upon detecting the user's selection of the hotspot 712, the snippet of text 720 that is hyperlinked to the selected hotspot 712 is displayed in the GUI 700. The snippet of text 720 includes one keyterm (atom) which is highlighted. As exemplified in FIG. 10, upon detecting the user's selection of the hotspot 714, the snippet of text 722 that is hyperlinked to the selected hotspot 714 is displayed in the GUI 700. The snippet of text 722 includes four keyterms (England, Physics, Manchester and Cambridge) which are highlighted.

Figure 10:
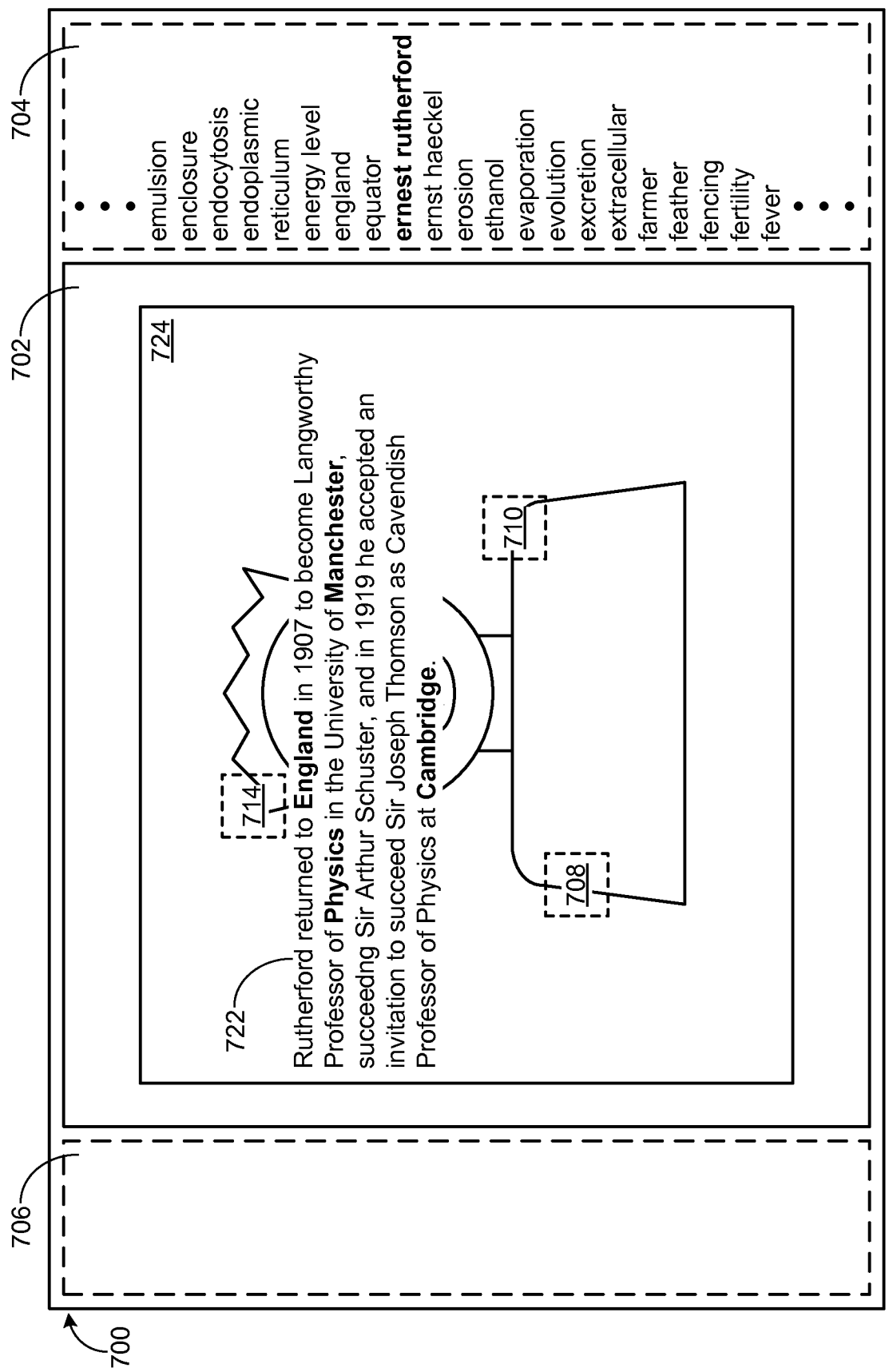

As exemplified in FIG. 11 and referring again to FIG. 10, upon detecting the user's selection of the keyterm Cambridge in the displayed snippet of text 722, another image 728 from the information repository that also has the keyterm Cambridge associated therewith is displayed within the current image sector 702, and a thumbnail 726 (e.g. a minified representation) of the previously displayed image 724 is displayed within the image history sector 706. Four hotspots 730/732/734/736 are also displayed on top of this other image 728, where each of the hotspots 730/732/734/736 is hyperlinked to a different snippet of text (e.g. snippet 738) about the image 728 which is semantically relevant to the image 728. Upon detecting the user's selection of the hotspot 730, the snippet of text 738 that is hyperlinked to the selected hotspot 730 is displayed in the image browsing GUI 700. The snippet of text 738 includes one keyterm (Cambridge) which is highlighted. As exemplified in FIG. 12, upon detecting the user's selection of the hotspot 732, the snippet of text 740 that is hyperlinked to the selected hotspot 732 is displayed in the GUI 700. The snippet of text 740 includes two keyterms (Venus and Earth) which are highlighted.

Figure 12:
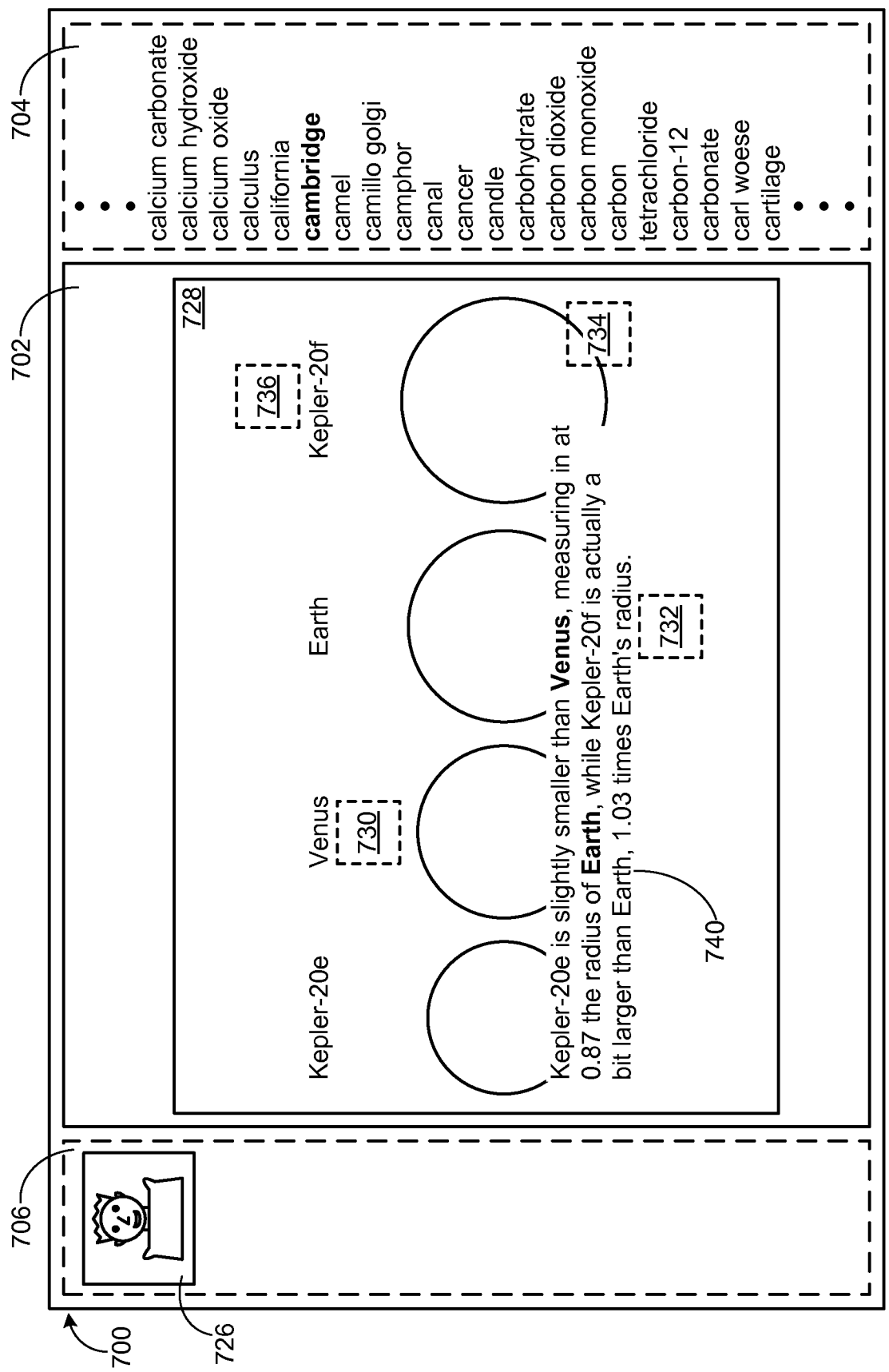
Figure 13:
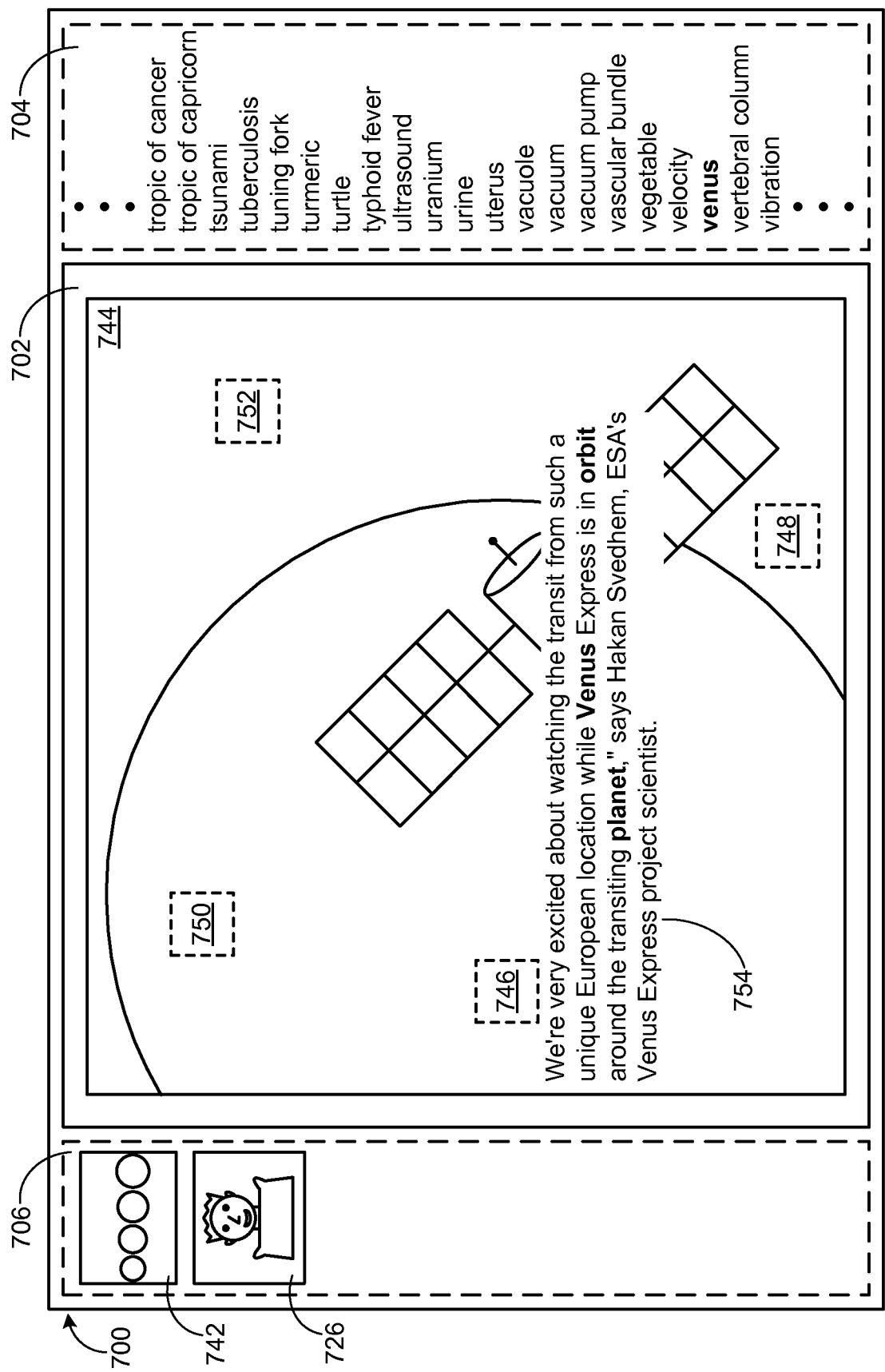

As exemplified in FIG. 13 and referring again to FIG. 12, upon detecting the user's selection of the keyterm Venus in the displayed snippet of text 740, another image 744 from the information repository that also has the keyterm Venus associated therewith is displayed within the current image sector 702, and a thumbnail 742 of the previously displayed image 728 is displayed within the image history sector 706 above the thumbnail 726. Four hotspots 746/748/750/752 are also displayed on top of this other image 744, where each of the hotspots 746/748/750/752 is hyperlinked to a different snippet of text (e.g. snippet 754) about the image 744 which is semantically relevant to the image 744. Upon detecting the user's selection of the hotspot 746, the snippet of text 754 that is hyperlinked to the selected hotspot 746 is displayed in the image browsing GUI 700. The snippet of text 754 includes three keyterms (Venus, orbit and planet) which are highlighted. As exemplified in FIG. 14, upon detecting the user's selection of the hotspot 750, the snippet of text 756 that is hyperlinked to the selected hotspot 750 is displayed in the GUI 700. The snippet of text 756 includes two keyterms (Venus and atmosphere) which are highlighted.

Figure 14:
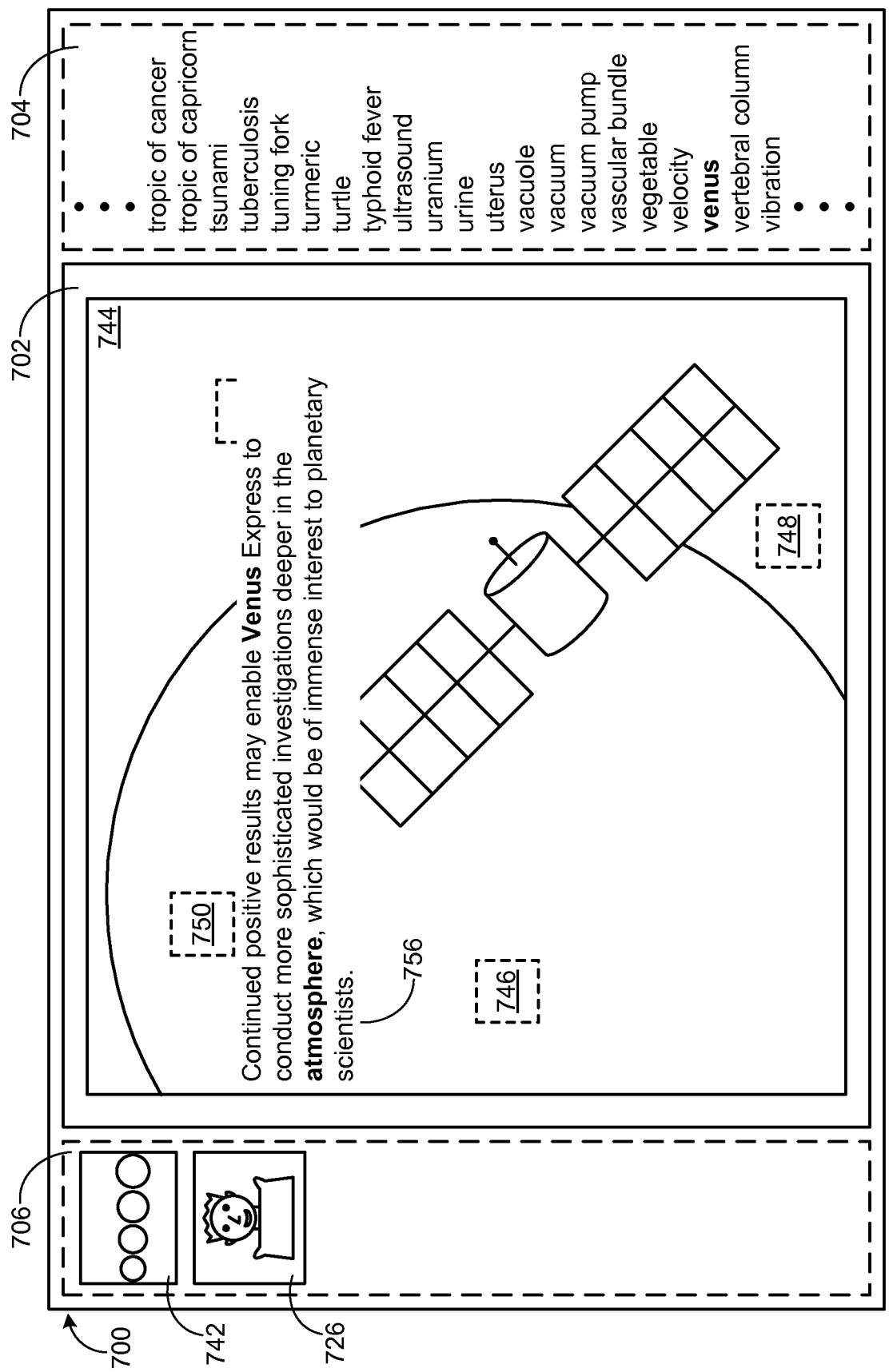
Figure 15:
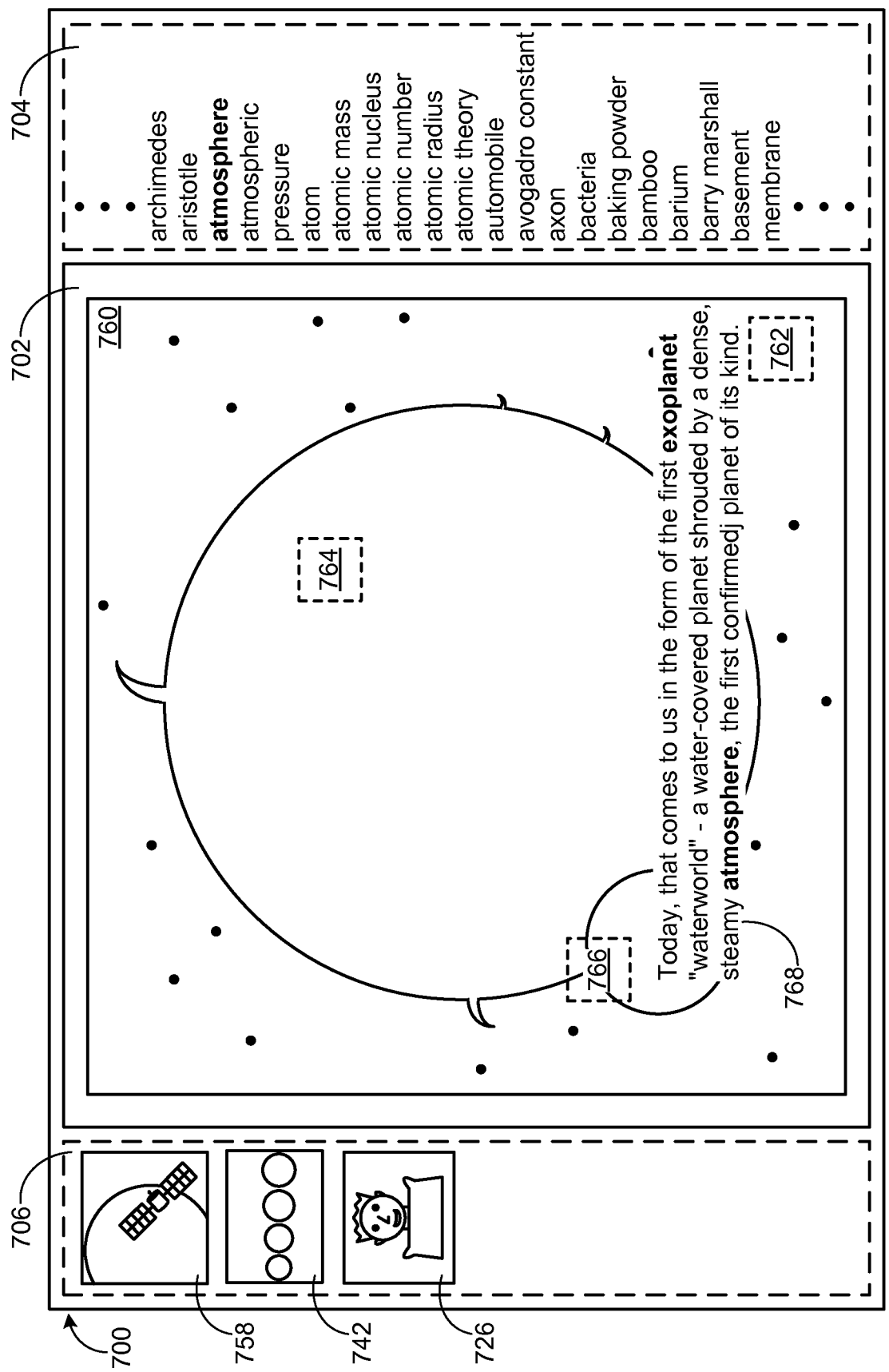

As exemplified in FIG. 15 and referring again to FIG. 14, upon detecting the user's selection of the keyterm atmosphere in the displayed snippet of text 756, another image 760 from the information repository that also has the keyterm atmosphere associated therewith is displayed within the current image sector 702, and a thumbnail 758 of the previously displayed image 744 is displayed within the image history sector 706 above the thumbnail 742 and the thumbnail 726. Three hotspots 762/764/766 are also displayed on top of this other image 760, where each of the hotspots 762/764/766 is hyperlinked to a different snippet of text (e.g. snippet 768) about the image 760 which is semantically relevant to the image 760. Upon detecting the user's selection of the hotspot 762, the snippet of text 768 that is hyperlinked to the selected hotspot 762 is displayed in the image browsing GUI 700. The snippet of text 768 includes two keyterms (exoplanet and atmosphere) which are highlighted.

Referring again to FIGS. 11-14, it will be appreciated that the image history sector 706 provides the user with a chronologically-organized history of the images that the user has previously viewed. In the event that the number of thumbnails (e.g., 726/742/758) to be displayed within the image history sector 706 exceeds the space that is available there-within, a scrollbar (not shown) can be added to the image history sector, thus allowing the user to scroll through the thumbnails. Upon detecting the user's selection of a given thumbnail in the image history sector 706, the image that is represented by the selected thumbnail is re-displayed within the current image sector 702, and one or more hotspots (each of which is hyperlinked to a different snippet of text about this image) are re-displayed on top of this image. By way of example but not limitation, upon detecting the user's selection of thumbnail 742 the image 728 and the hotspots 730/732/734/736 are re-displayed within the current image sector 702. It will also be appreciated that the image history sector 706 can be organized in various other ways. By way of example but not limitation and as exemplified in FIGS. 13-15, rather than the thumbnail of the most recent previously displayed image being placed above any thumbnail(s) that may already exist within the image history sector 706, the thumbnail of the most recent previously displayed image can be placed below any thumbnail(s) that may already exist within the image history sector.

Figure 11:
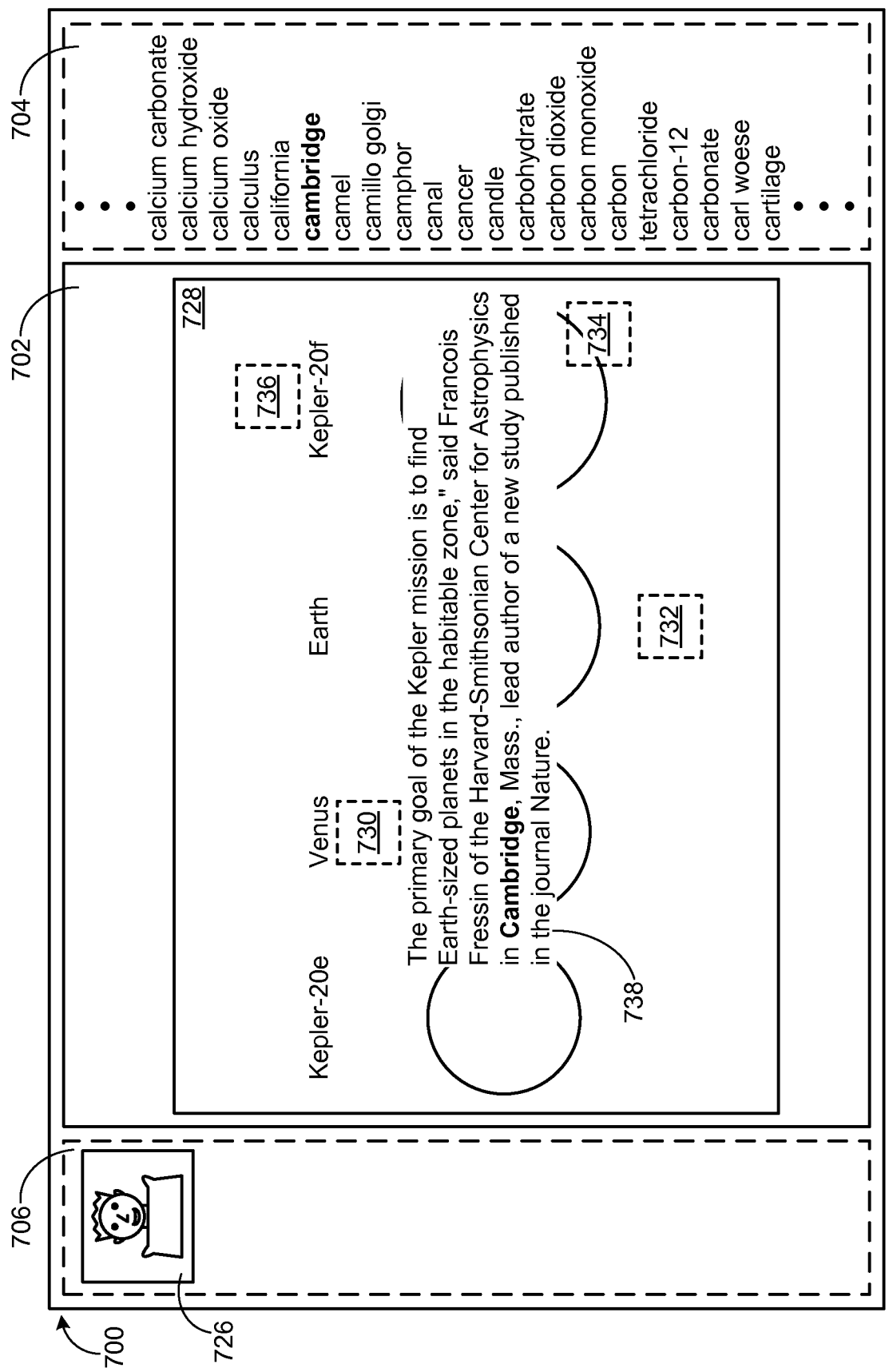

Referring again to FIGS. 7-15, the operation and functionality of the keyterms sector 704 will now be described in more detail. In the image browsing GUI 700 exemplified in FIGS. 7-15 a keyterms list is displayed within the keyterms sector 704, where the keyterms list includes an alphabetically-organized listing of all of the keyterms that are associated with all of the images that are stored in the information repository. In the event that the number of keyterms in the keyterms list exceeds the space that is available within the keyterms sector 704, a scrollbar (not shown) can be added to the keyterms sector, thus allowing the user to scroll through the keyterms list. Upon the display of a given image within the current image sector 702, the keyterms list is automatically scrolled such that the portion of the keyterms list that is currently displayed within the keyterms sector 704 includes the particular keyterm in a given displayed snippet of text about the image that the user just selected (thus causing the image to be displayed within the current image sector), and this just-selected keyterm is highlighted in the keyterms sector. By way of example but not limitation, upon detecting the user's selection of the keyterm Cambridge in the displayed snippet of text 722 about the image 724 that is displayed within the current image sector 702 shown in FIG. 10, the keyterms list is automatically scrolled such that the portion of the keyterms list that is currently displayed within the keyterms sector 704 includes the just-selected keyterm cambridge and the keyterm cambridge is highlighted in the keyterms sector as shown in FIG. 11.

It will be appreciated that various alternate embodiments of the keyterms sector are also possible including, but not limited to, the following. In one alternate embodiment of the keyterms sector, when the user begins a new image browsing session the keyterms list in the keyterms sector starts out being empty, and is then incrementally populated with the different keyterms the user selects during the session (e.g., each keyterm that the user selects is added to the keyterms list). In another alternate embodiment of the keyterms sector, when the user begins a new image browsing session the keyterms list in the keyterms sector starts out being empty, and is then incrementally populated with all of the keyterms that are associated with the different images that are displayed within the current image sector during the session (e.g., as a new image is displayed within the current image sector, all of the keyterms that are associated with the new image are added to the keyterms list). In yet another alternate embodiment of the keyterms sector, when the user begins a new image browsing session the keyterms list in the keyterms sector starts out being empty, and is then incrementally populated with the keyterm that is associated with each different image that is displayed within the current image sector the greatest number of times (e.g., as a new image is displayed within the current image sector, the keyterm that is associated with the new image the greatest number of times is added to the keyterms list). In yet another alternate embodiment of the keyterms sector, the keyterms sector includes a text entry box that allows the user to search all of the keyterms that are associated with all of the images that are stored in the information repository for a desired keyterm (e.g., the user can search the repository for images that are related to a desired concept or entity). This text entry box can optionally include an auto-complete feature that directs the user to keyterms that are associated with the images in the repository. Any combination of these just-described alternate embodiments can also be used.

In an exemplary embodiment of the image browsing framework described herein, upon detecting the user's selection of a given one of the keyterms in the just-described keyterms list that is displayed within the keyterms sector the following actions take place. This user selection is detected. Another image from the information repository is then selected that also has the selected keyterm associated therewith, where this other image selection can be implemented in any of the aforementioned ways. This selected other image is then displayed within the current image sector.

2.0 Additional Embodiments

While the image browsing framework has been described by specific reference to embodiments thereof, it is understood that variations and modifications thereof can be made without departing from the true spirit and scope of the image browsing framework. By way of example but not limitation, rather than each of the images that are stored in the information repository being prepared for browsing in advance of a user's image browsing activities as described heretofore, the following alternate embodiment of the image browsing framework described herein is possible. The text that is stored in the repository can be mined to extract the aforementioned snippets of text about a given image, the aforementioned keyterms can be detected in each of these extracted snippets, and these extracted snippets and detected keyterms can be associated with the image on-the-fly upon receiving the user's request to display the image.

Additionally, upon detecting the user's selection of a given keyterm in a given displayed snippet of text about a given image that is currently being displayed within the current image sector of the image browsing GUI, rather than displaying another image from the information repository that also has the selected keyterm associated therewith within the current image sector as described heretofore, the following different things can happen. In one alternate embodiment of the image browsing framework described herein a collection of thumbnails of other images stored in the repository that also have the selected keyterm associated therewith can be displayed within the current image sector, where this collection of thumbnails can include either all of the images in the repository that also have the selected keyterm associated therewith, or a prescribed number of the top scoring other images stored in the repository that also have the selected keyterm associated therewith. When the user selects a particular thumbnail in the collection of thumbnails, this selection can be detected and the image that is represented by the selected thumbnail can be displayed within the current image sector. In another alternate embodiment of the image browsing framework information about the selected keyterm can be displayed to the user.

Furthermore, upon detecting the user's selection of a given keyterm in a given displayed snippet of text about a given image that is currently being displayed within the current image sector of the image browsing GUI, the following additional different things can happen. In yet another alternate embodiment of the image browsing framework described herein a query to a search engine can be generated, where this query can include either the selected keyterm or the entire displayed snippet of text from which the keyterm was selected. The search engine can then search the repository for information that is related to the query, and the search results can be received from the search engine and displayed within the current image sector. It is noted that these search results can include a wide variety of different types of information such as a page of images that are related to the query, among other things. Upon the user selecting an image that is included in the search results, the selected image can be displayed within the current image sector of the GUI and one or more hotspots can be displayed on top of the selected image, where each of the hotspots is hyperlinked to a different snippet of text about the selected image. It will be appreciated that this particular alternate embodiment is advantageous since it takes into account the user's recent browsing history and can also take into account recent trends of what other users have looked at, among other things. In yet another embodiment of the image browsing framework currently trending topics and images that are related to the selected keyterm can be displayed within the current image sector.

Yet furthermore, the following alternate embodiment of the image browsing GUI is also possible. Rather than displaying the aforementioned desired image or selected other image (hereafter collectively simply referred to as the given image) within the current image sector of the GUI as described heretofore, a graph of images can be displayed within the current image sector, where this graph includes a thumbnail of the given image and thumbnails of the images in the information repository that are hyperlinked to the keyterms that are associated with the given image (or a prescribed subset of these hyperlinked images). The graph of images also includes graphical connections between different pairs of thumbnails in the graph, where a given graphical connection between a given pair of thumbnails indicates that the pair of images in the repository that is represented by the given pair of thumbnails has one or more keyterms in common. It will thus be appreciated that the graph of images displays the semantic relationships between the images in the repository that are represented by the thumbnails in the graph.

Figure 17:
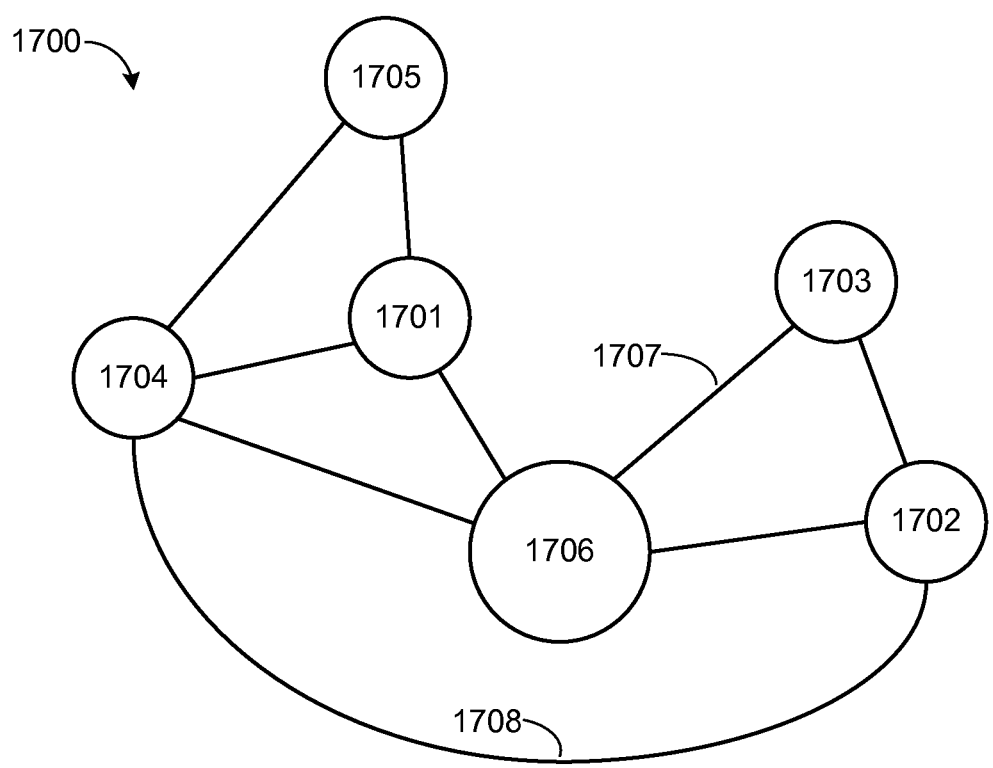
FIG. 17 is a diagram illustrating an alternate embodiment, in simplified form, of a generalized layout for the GUI that allows the user to semantically browse the images that are stored in the information repository.

FIG. 17 illustrates an exemplary embodiment, in simplified form, of the just-described graph of images. As exemplified in FIG. 17, the graph of images 1700 includes the thumbnails of six different images 1701-1706, where thumbnail 1706 represents the just-described given image and thumbnails 1701-1705 represent images in the information repository that are hyperlinked to the keyterms that are associated with the given image. The graph 1700 also includes various graphical connections (e.g., connections 1707 and 1708) between different pairs of thumbnails in the graph, where a given graphical connection between a given pair of thumbnails (e.g., the connection 1707 between thumbnail 1706 and thumbnail 1703) indicates that the pair of images in the repository that is represented by the given pair of thumbnails has one or more keyterms in common (e.g., the images represented by thumbnails 1706 and 1703 have one or more keyterms in common). The graph 1700 can be interactively browsed by the user in various ways including, but not limited to, the following. Upon detecting the user's selection of thumbnail 1702, a new graph of images (not shown) can be displayed within the current image sector, where this new graph includes the selected thumbnail 1702 and thumbnails of the images in the repository that are hyperlinked to the keyterms that are associated with the image in the repository that is represented by the selected thumbnail 1702. Upon detecting the user's selection of connection 1707, various information about the semantic relationship between the images represented by thumbnails 1706 and 1703 (e.g., the keyterm(s) that these images have in common) can be displayed to the user.

It is also noted that any or all of the aforementioned embodiments can be used in any combination desired to form additional hybrid embodiments. Although the image browsing framework embodiments have been described in language specific to structural features and/or methodological acts, it is to be understood that the subject matter defined in the appended claims is not necessarily limited to the specific features or acts described heretofore. Rather, the specific features and acts described heretofore are disclosed as example forms of implementing the claims.

3.0 Exemplary Operating Environments

Figure 16:
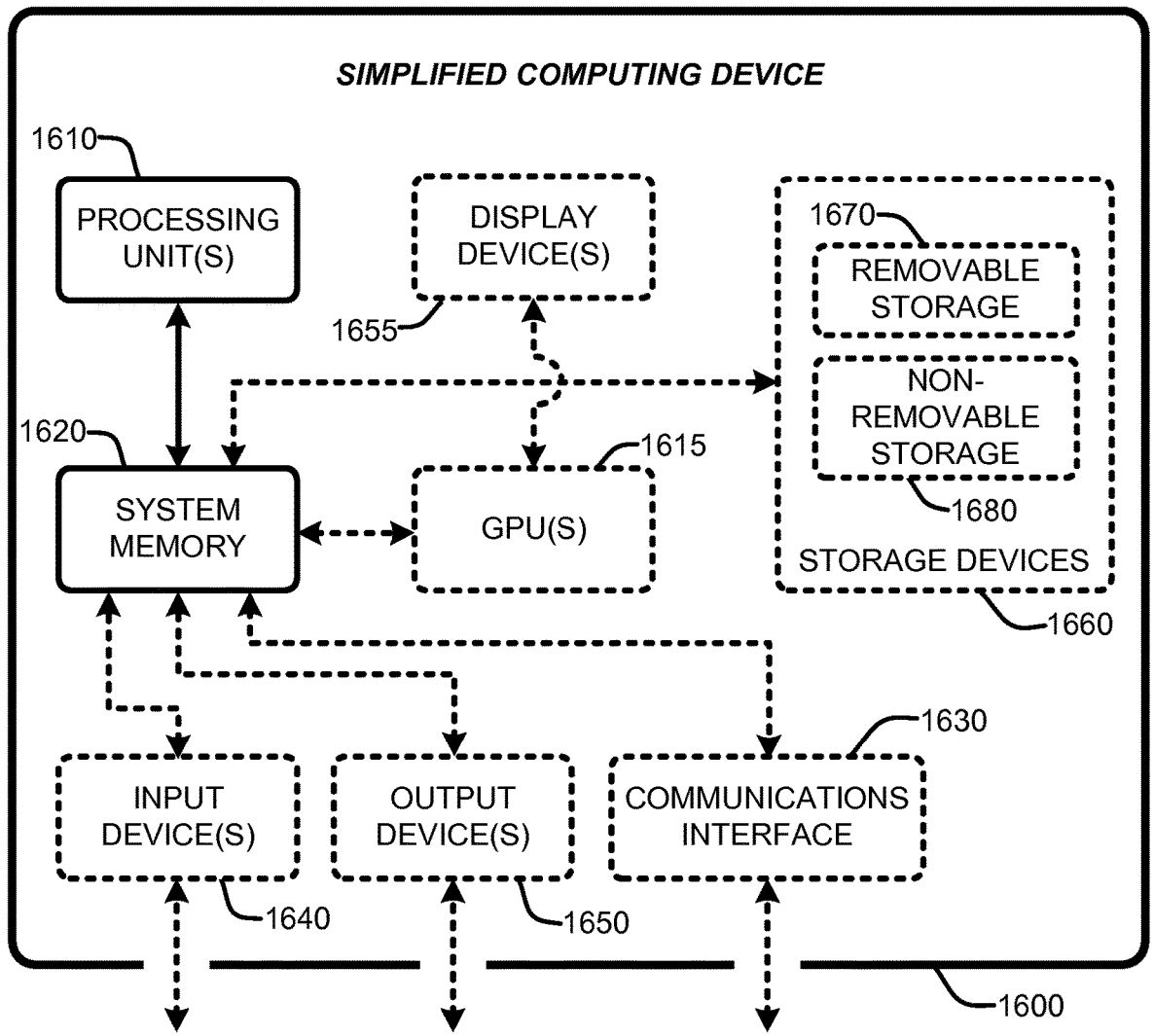
FIG. 16 is a diagram illustrating a simplified example of a general-purpose computer system on which various embodiments and elements of the image browsing framework, as described herein, may be implemented.

The image browsing framework embodiments described herein are operational within numerous types of general purpose or special purpose computing system environments or configurations. FIG. 16 illustrates a simplified example of a general-purpose computer system on which various embodiments and elements of the image browsing framework, as described herein, may be implemented. It is noted that any boxes that are represented by broken or dashed lines in FIG. 16 represent alternate embodiments of the simplified computing device, and that any or all of these alternate embodiments, as described below, may be used in combination with other alternate embodiments that are described throughout this document.

For example, FIG. 16 shows a general system diagram showing a simplified computing device 1600. Such computing devices can be typically be found in devices having at least some minimum computational capability, including, but not limited to, personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the image browsing framework embodiments described herein, the device should have a sufficient computational capability and system memory to enable basic computational operations. In particular, as illustrated by FIG. 16, the computational capability is generally illustrated by one or more processing unit(s) 1610, and may also include one or more graphics processing units (GPUs) 1615, either or both in communication with system memory 1620. Note that that the processing unit(s) 1610 of the simplified computing device 1600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores including, but not limited to, specialized GPU-based cores in a multi-core CPU.

In addition, the simplified computing device 1600 of FIG. 16 may also include other components, such as, for example, a communications interface 1630. The simplified computing device 1600 of FIG. 16 may also include one or more conventional computer input devices 1640 (e.g., pointing devices, keyboards, audio (e.g., voice) input devices, video input devices, haptic input devices, gesture recognition devices, devices for receiving wired or wireless data transmissions, and the like). The simplified computing device 1600 of FIG. 16 may also include other optional components, such as, for example, one or more conventional computer output devices 1650 (e.g., display device(s) 1655, audio output devices, video output devices, devices for transmitting wired or wireless data transmissions, and the like). Note that typical communications interfaces 1630, input devices 1640, output devices 1650, and storage devices 1660 for general-purpose computers are well known to those skilled in the art, and will not be described in detail herein.

The simplified computing device 1600 of FIG. 16 may also include a variety of computer-readable media. Computer-readable media can be any available media that can be accessed by the computer 1600 via storage devices 1660, and can include both volatile and nonvolatile media that is either removable 1670 and/or non-removable 1680, for storage of information such as computer-readable or computer-executable instructions, data structures, program modules, or other data. By way of example but not limitation, computer-readable media may include computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, and the like, can also be accomplished by using any of a variety of the aforementioned communication media to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves. Combinations of any of the above should also be included within the scope of communication media.

Furthermore, software, programs, and/or computer program products embodying some or all of the various image browsing framework embodiments described herein, or portions thereof, may be stored, received, transmitted, or read from any desired combination of computer-readable or machine-readable media or storage devices and communication media in the form of computer-executable instructions or other data structures.

Finally, the image browsing framework embodiments described herein may be further described in the general context of computer-executable instructions, such as program modules, being executed by a computing device. Generally, program modules include routines, programs, objects, components, data structures, and the like, that perform particular tasks or implement particular abstract data types. The image browsing framework embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

What is claimed is:

1. A computer-implemented process for allowing a user to browse images stored in an information repository, comprising:
    displaying an image browsing graphical user interface (GUI) on a display device;
    receiving a request from the user to view a first image in the information repository;
    displaying the first image in the GUI;
    displaying a first hotspot on the first image in the GUI, the first hotspot being hyperlinked to a first snippet of text providing textual information corresponding to the first image, the first snippet of text including a first plurality of non-selectable terms, and a first keyterm and a second keyterm embedded among the first plurality of non-selectable terms, the first keyterm being hyperlinked to a first set of images in the information repository, each image in the first set having a corresponding hotspot hyperlinked to a corresponding snippet of text including the first keyterm, and the second keyterm being hyperlinked to a second set of images, different than the first set of images, in the information repository, each image in the second set having a corresponding hotspot hyperlinked to a corresponding snippet of text including the second keyterm, the first image being included in the first set of images and the second set of images;
    receiving a selection of the first hotspot hyperlinked to the first snippet of text,
    responsive to the selection of the first hotspot hyperlinked to the first snippet of text including the first keyterm and the second keyterm, displaying the first snippet of text including the first keyterm and the second keyterm;
    receiving a selection of the first keyterm;
    responsive to the selection of the first keyterm, displaying in the GUI a second image having a second hotspot hyperlinked to a second snippet of text including the first keyterm, the second image being selected from the first set of images; and
    receiving a selection of the second keyterm;
    responsive to the selection of the second keyterm, displaying in the GUI a third image having a third hots pot hyperlinked to a third snippet of text including the second keyterm, the third image being selected from the second set of images.

2. The process of claim 1, further comprising:
    highlighting each of the first and second keyterms in the displayed first snippet of text in a manner that allows the user to distinguish the first and second keyterms from the non-selectable terms in the displayed first snippet of text.

3. The process of claim 1, wherein displaying the first snippet of text that is hyperlinked to the selected first hotspot in the GUI comprises either:
    popping up said first snippet of text on top of the first image and adjacent to the selected first hotspot; or
    popping up said first snippet of text on a side of the first image; or
    popping up said first snippet of text in a prescribed fixed location on top of the first image.

4. The process of claim 2, wherein highlighting each of the first and second keyterms in the displayed first snippet of text in a manner that allows the user to distinguish the first and second keyterms from the non-selectable terms in the displayed first snippet of text comprises one or more of:
    bolding the characters of each of the first and second keyterms in the displayed first snippet of text; or
    changing the color of the characters of each of the first and second keyterms in the displayed first snippet of text; or
    underlining the characters of each of the first or second keyterms in the displayed first snippet of text.

5. The process of claim 1,
    wherein the second snippet of text further includes a plurality of non-selectable terms and a fourth keyterm embedded among the plurality of non-selectable terms, the fourth keyterm being hyperlinked to a third set of images in the information repository each having a corresponding hotspot hyperlinked to a corresponding snippet of text including the fourth keyterm, the second image being included in the first set of images and the third set of images.

6. The process of claim 5, wherein the second image is selected from the information repository based on having the selected first keyterm associated therewith the greatest number of times.

7. The process of claim 5, wherein the GUI further comprises an image history sector that provides the user with a chronologically-organized history of images that the user previously viewed, wherein the process further comprises:
- displaying a thumbnail of the first image within the image history sector of the GUI;
- detecting a selection of said thumbnail;
- re-displaying the first image in the GUI based on the selection of said thumbnail; and
- re-displaying the first hotspot on top of the first image.

8. The process of claim 1, wherein the GUI further comprises a snippet sector, and wherein the first snippet of text that is hyperlinked to the selected first hotspot is displayed within the first snippet sector of the GUI.

9. The process of claim 1, further comprising:
- detecting a selection of one of the first or second keyterms in the displayed first snippet of text;
- generating a query to a search engine, the query comprising either the selected first keyterm, or the entire displayed first snippet of text;
- receiving search results from the search engine; and
- displaying the search results in the GUI.

10. The process of claim 1, further comprising:
- detecting a selection of one of the first or second keyterms in the displayed first snippet of text; and
- displaying thumbnails of other images in the information repository that also have the selected first keyterm associated therewith in the GUI.

11. The process of claim 1, wherein the GUI further comprises a text entry box that allows the user to search all of the keyterms that are associated with all of the images in the information repository for a desired keyterm.

12. The process of claim 1, wherein each different snippet of text about the first image comprises a combined relevance and interestingness score, and wherein the process further comprises displaying a default snippet of text about the first image in the GUI, said default snippet of text comprising either:
- a snippet of text about the first image comprising a greatest combined relevance and interestingness score; or
- a snippet of text about the first image in which a particular keyterm that the user most recently selected appears the greatest number of times; or
- a snippet of text about the first image in which the particular query term that the user originally used to search for the desired first image appears the greatest number of times.

13. A computer, comprising:
one or more processors;
one or more storage devices holding instructions executable by the one or more processors to:
- display an image browsing graphical user interface (GUI) on a display device;
- receive a request from the user to view a first image in an information repository;
- display the first image in the GUI;
- display a first hotspot on the first image in the GUI, the first hotspot being hyperlinked to a first snippet of text providing textual information corresponding to the first image, the first snippet of text including a first plurality of non-selectable terms, and a first keyterm and a second keyterm embedded among the first plurality of non-selectable terms, the first keyterm being hyperlinked to a first set of images in the information repository each image in the first set having a corresponding hotspot hyperlinked to a corresponding snippet of text including the first keyterm, and the second keyterm being hyperlinked to a second set of images, different than the first set of images, in the information repository, each image in the second set having a corresponding hotspot hyperlinked to a corresponding snippet of text including the second keyterm, the first image being included in the first set of images and the second set of images;
- receive a selection of the first hotspot hyperlinked to the first snippet of text,
- responsive to the selection of the first hotspot hyperlinked to the first snippet of text including the first keyterm and the second keyterm, displaying the first snippet of text including the first keyterm and the second keyterm;
- receive a selection of the first keyterm;
- responsive to the selection of the first keyterm, displaying in the GUI a second image having a second hotspot hyperlinked to a second snippet of text including the first keyterm, the second image being selected from the first set of images; and
- receive a selection of the second keyterm;
- responsive to the selection of the second keyterm, displaying in the GUI a third image having a third hotspot hyperlinked to a third snippet of text including the second keyterm, the third image being selected from the second set of images.

* * * * *